(12) United States Patent
Ellis et al.

(10) Patent No.: US 9,864,545 B2
(45) Date of Patent: Jan. 9, 2018

(54) OPEN ERASE BLOCK READ AUTOMATION

(71) Applicant: SanDisk Technologies LLC, Plano, TX (US)

(72) Inventors: Robert W. Ellis, Phoenix, AZ (US); Vidyabhushan Mohan, San Jose, CA (US); Jack Edward Frayer, Boulder Creek, CA (US)

(73) Assignee: SanDisk Technologies LLC, Plano, TX (US)

( * ) Notice: Subject to any disclaimer, the term of this patent is extended or adjusted under 35 U.S.C. 154(b) by 0 days.

(21) Appl. No.: 14/925,943

(22) Filed: Oct. 28, 2015

(65) Prior Publication Data

US 2016/0306591 A1    Oct. 20, 2016

Related U.S. Application Data

(60) Provisional application No. 62/147,546, filed on Apr. 14, 2015.

(51) Int. Cl.
*G06F 12/00* (2006.01)
*G06F 3/06* (2006.01)

(52) U.S. Cl.
CPC .......... *G06F 3/0653* (2013.01); *G06F 3/061* (2013.01); *G06F 3/0679* (2013.01)

(58) Field of Classification Search
CPC ....... G06F 3/061; G06F 3/0653; G06F 3/0679
See application file for complete search history.

(56) References Cited

U.S. PATENT DOCUMENTS

| 4,586,167 A | 4/1986 | Fujishima et al. |
| 5,559,988 A | 9/1996 | Durante et al. |
| 5,909,559 A | 6/1999 | So |
| 6,247,136 B1 | 6/2001 | MacWilliams et al. |
| 6,292,410 B1 | 9/2001 | Yi et al. |
| 6,401,213 B1 | 6/2002 | Jeddeloh |
| 6,449,709 B1 | 9/2002 | Gates |

(Continued)

FOREIGN PATENT DOCUMENTS

| EP | 0 376 285 A2 | 7/1990 |
| WO | WO 2012/083308 | 6/2012 |

OTHER PUBLICATIONS

Seagate Technology, "SCSI Commands Reference Manual, Rev. C", Product Manual dated Apr. 2010, pp. 211-214.

(Continued)

*Primary Examiner* — Yong Choe
(74) *Attorney, Agent, or Firm* — Brinks Gilson & Lione

(57) ABSTRACT

Systems, methods, and/or devices are used to automate read operations performed at an open erase block. In one aspect, the method includes: receiving a read command, at a storage device, to read data from non-volatile memory of the storage device. In response to receiving the read command, the method further includes: 1) reading data using a first set of memory operation parameters in response to a determination that the read command is not for reading data from a predefined portion of an open erase block (e.g., an erase block that is determined to be an open erase block) of the non-volatile memory and 2) reading data using a second set of memory operation parameters (i.e., the second set is distinct from the first set) in response to a determination that the read command is for reading data from the predefined portion of an open erase block of the non-volatile memory.

20 Claims, 10 Drawing Sheets

(56) References Cited

U.S. PATENT DOCUMENTS

| | | |
|---|---|---|
| 8,122,202 B2 | 2/2012 | Gillingham |
| 8,213,255 B2 | 7/2012 | Hemink et al. |
| 8,825,967 B2 | 9/2014 | Hong Beom |
| 2003/0115403 A1 | 6/2003 | Bouchard et al. |
| 2003/0122834 A1 | 7/2003 | Mastronarde et al. |
| 2004/0117441 A1 | 6/2004 | Liu et al. |
| 2005/0248992 A1 | 11/2005 | Hwang et al. |
| 2007/0002629 A1 | 1/2007 | Lee et al. |
| 2007/0233937 A1 | 10/2007 | Coulson et al. |
| 2008/0140914 A1 | 6/2008 | Jeon |
| 2009/0168525 A1 | 7/2009 | Olbrich et al. |
| 2009/0222627 A1 | 9/2009 | Reid |
| 2009/0282191 A1 | 11/2009 | Depta |
| 2010/0005217 A1 | 1/2010 | Jeddeloh |
| 2010/0014364 A1 | 1/2010 | Laberge et al. |
| 2010/0174845 A1 | 7/2010 | Gorobets et al. |
| 2010/0174853 A1 | 7/2010 | Lee et al. |
| 2010/0220509 A1 | 9/2010 | Solokov et al. |
| 2010/0250874 A1 | 9/2010 | Farrell et al. |
| 2011/0113204 A1 | 5/2011 | Henriksson et al. |
| 2011/0235434 A1 | 9/2011 | Byom et al. |
| 2011/0264851 A1 | 10/2011 | Jeon et al. |
| 2011/0302474 A1 | 12/2011 | Goss et al. |
| 2012/0030408 A1 | 2/2012 | Flynn et al. |
| 2012/0047317 A1 | 2/2012 | Yoon et al. |
| 2012/0159070 A1 | 6/2012 | Baderdinni et al. |
| 2012/0224425 A1 | 9/2012 | Fai et al. |
| 2013/0007380 A1 | 1/2013 | Seekins et al. |
| 2013/0070507 A1 | 3/2013 | Yoon |
| 2013/0132650 A1 | 5/2013 | Choi et al. |
| 2013/0182506 A1 | 7/2013 | Melik-Martirosian |
| 2013/0219106 A1 | 8/2013 | Vogan et al. |
| 2013/0254498 A1 | 9/2013 | Adachi et al. |
| 2013/0297894 A1 | 11/2013 | Cohen et al. |
| 2013/0346805 A1 | 12/2013 | Sprouse et al. |
| 2014/0047170 A1 | 2/2014 | Cohen et al. |
| 2014/0173239 A1 | 6/2014 | Schushan |
| 2014/0229655 A1 | 8/2014 | Goss et al. |
| 2014/0229656 A1 | 8/2014 | Goss et al. |
| 2014/0241071 A1 | 8/2014 | Goss et al. |
| 2014/0244897 A1 | 8/2014 | Goss et al. |
| 2014/0258598 A1 | 9/2014 | Canepa et al. |
| 2014/0310241 A1 | 10/2014 | Goyen |
| 2015/0074487 A1 | 3/2015 | Patapoutian et al. |
| 2015/0095558 A1 | 4/2015 | Kim et al. |
| 2015/0186278 A1 | 7/2015 | Jayakumar et al. |
| 2015/0301749 A1 | 10/2015 | Seo et al. |
| 2015/0331627 A1 | 11/2015 | Kwak |
| 2016/0026386 A1 | 1/2016 | Ellis et al. |
| 2016/0034194 A1 | 2/2016 | Brokhman et al. |
| 2016/0062699 A1 | 3/2016 | Samuels et al. |
| 2016/0070493 A1 | 3/2016 | Oh et al. |
| 2016/0117099 A1 | 4/2016 | Prins et al. |
| 2016/0117105 A1 | 4/2016 | Thangaraj et al. |
| 2016/0117252 A1 | 4/2016 | Thangaraj et al. |
| 2016/0170671 A1 | 6/2016 | Huang |
| 2016/0170831 A1 | 6/2016 | Lesatre et al. |
| 2016/0179403 A1 | 6/2016 | Kurotsuchi et al. |
| 2016/0299699 A1 | 10/2016 | Vanaraj et al. |
| 2016/0299704 A1 | 10/2016 | Vanaraj et al. |
| 2016/0299724 A1 | 10/2016 | Vanaraj et al. |

OTHER PUBLICATIONS

Tanenbaum, "Structured Computer Organization", 3rd edition 1990, section 1.4, p. 11, 3 pages.

International Search Report and Written Opinion dated Nov. 18, 2015, received in International Patent Application No. PCT/US2015/039552 which corresponds to U.S. Appl. No. 14/559,183, 11 pages (Ellis).

International Search Report and Written Opinion dated Jul. 4, 2016, received in International Patent Application No. PCT/US2016/028477, which corresponds to U.S. Appl. No. 14/883,540, 11 pages (Hodgdon).

International Search Report and Written Opinion dated Nov. 9, 2015, received in International Patent Application No. PCT/US2015/053551, which corresponds to U.S. Appl. No. 14/668,690, 12 pages (Thangaraj).

International Search Report and Written Opinion dated Nov. 11, 2015, received in International Patent Application No. PCT/US2015/053582, which corresponds to U.S. Appl. No. 14/659,493, 12 pages (Prins).

International Search Report and Written Opinion dated Sep. 8, 2016, received in International Patent Application No. PCT/US2016/036716, which corresponds to U.S. Appl. No. 14/925,945, 13 pages (Ellis).

Atmel Data-sheet, "9-to-bit Selectable, ±0.5° C. Accurate Digital Temperature Sensor with Nonvolatile Registers and Serial EEPROM" www.atmel.com/images/Atmel-8854-DTS-AT30TSE752A-754A-758A-Datasheet.pdf, Atmel Data-sheet, Mar 1, 2011, —Atmel-8854-DTS-AT30TSE752A-754A-758A-Datasheet_102014, 57 pages.

OPEN ERASE BLOCK READ AUTOMATION

RELATED APPLICATIONS

This application claims priority to U.S. Provisional Patent Application No. 62/147,546, filed Apr. 14, 2015, which is incorporated by reference in its entirety.

TECHNICAL FIELD

The disclosed embodiments relate generally to command processing in a storage device (e.g., a device including one or more flash memory devices), and in particular, to open erase block read automation.

BACKGROUND

Semiconductor memory devices, including flash memory, typically utilize memory cells to store data as an electrical value, such as an electrical charge or voltage. A flash memory cell, for example, includes a single transistor with a floating gate that is used to store a charge representative of a data value. Flash memory is a non-volatile data storage device that can be electrically erased and reprogrammed. More generally, non-volatile memory (e.g., flash memory, as well as other types of non-volatile memory implemented using any of a variety of technologies) retains stored information even without power, as opposed to volatile memory, which requires power to maintain the stored information.

Executing a write operation at a first portion (e.g., a first word line within an erase block) of a semiconductor memory device (e.g., flash memory device) can impact the charge stored in a second, neighboring portion (e.g., a second word line within the erase block) of the semiconductor memory device. As such, subsequent attempts to read data from the second, neighboring portion can result in erroneous readings and/or elevated bit error rates.

SUMMARY

Without limiting the scope of the appended claims, after considering this disclosure, and particularly after considering the section entitled "Detailed Description" one will understand how the aspects of various embodiments are implemented and used to manage read operations performed at open erase blocks within non-volatile storage devices, in order to reduce the occurrence of erroneous readings and improve the reliability of non-volatile storage devices. In some embodiments, when a read command to read data from non-volatile memory of a non-volatile storage device specifies an address corresponding to an open erase block (e.g., an erase block that still has one or more pages to which data can be written), a determination is made as to whether the read command is requesting that data be read from a last written word line (or page or other block portion) of the open erase block. If so, the corresponding read operation is performed using a set of memory operation parameters different from those used to read data in other portions of the same erase block or from other erase blocks. As a result, reading errors from such erase block locations are reduced and the reliability of the non-volatile storage device is improved.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

Figure 1A:
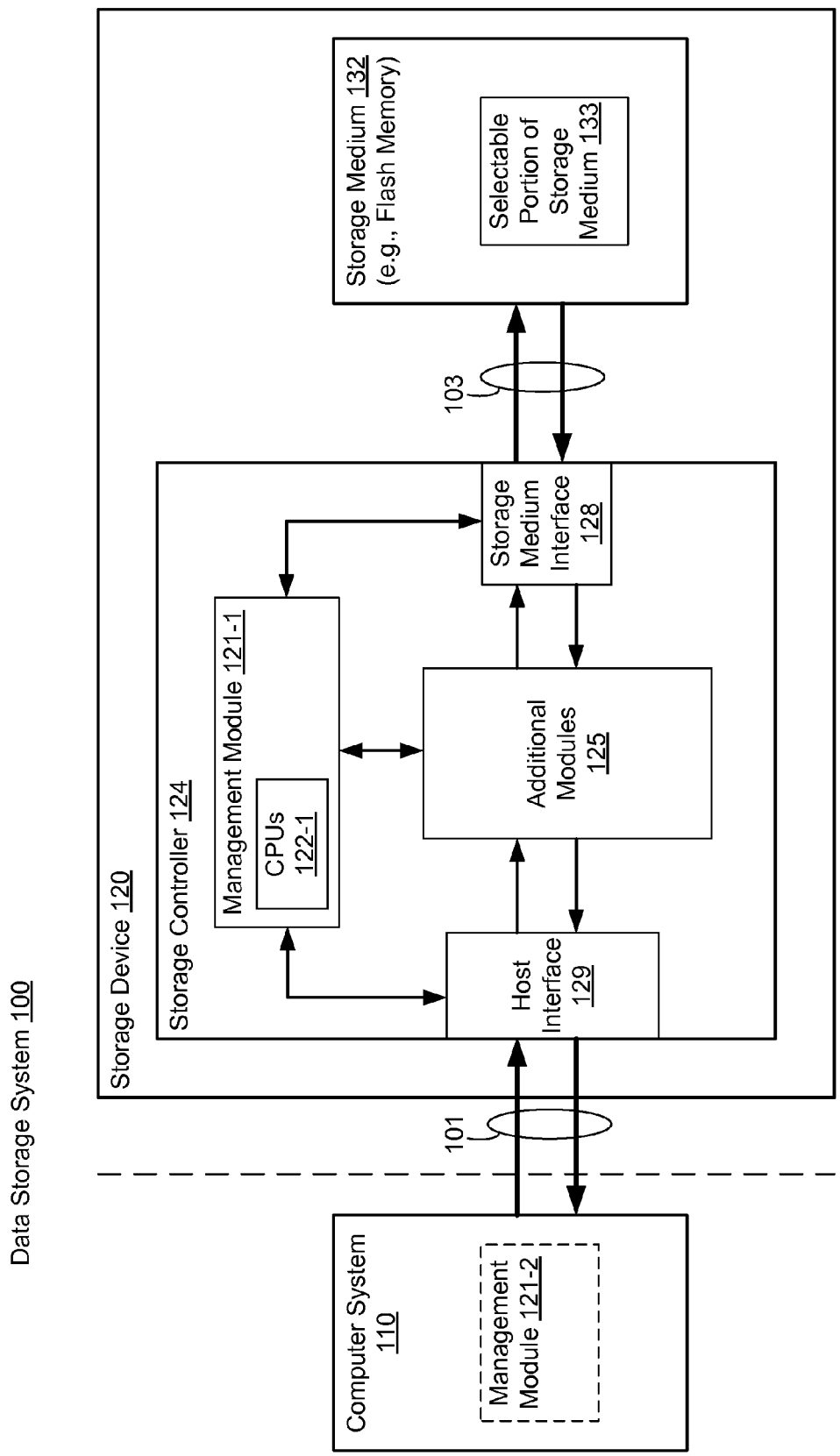
FIGS. 1A and 1B are block diagrams illustrating implementations of a data storage system in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Erroneous readings and/or elevated bit error rates negatively impact the reliability and desirability of a storage device. Consequently, what is desired are mechanisms for automating read operations performed at open erase blocks within a storage device (e.g., a non-volatile storage device, such as a flash memory device), in order to ensure reduce the occurrence of erroneous readings and/or elevated bit error rates.

The various embodiments described herein include systems, methods, and/or devices used to automate read operations performed at open erase blocks within a storage device. In one aspect, the method includes using different sets of memory operation parameters to read data from predefined portions of open erase blocks (e.g., an erase block that is determined to be an open erase block) of non-volatile memory on the one hand, and other portions of non-volatile memory on the other hand.

(A1) More specifically, some embodiments include a method of managing a storage device that includes non-volatile memory. In some embodiments, the method includes receiving at the storage device a read command to read data from the non-volatile memory of the storage device. In response to receiving the read command, determining whether the read command is for reading data from a predefined portion of an erase block of the non-volatile memory that is an open erase block. In response to a determination that the read command is not for reading data from the predefined portion of an open erase block of the non-volatile memory, reading data from the non-volatile memory using a first set of memory operation parameters. In response to a determination that the read command is for reading data from the predefined portion of an open erase block of the non-volatile memory, reading data from the non-volatile memory using a second set of memory operation parameters that is different from the first set of memory operation parameters.

(A2) In some embodiments of the method of A1, the predefined portion of an open erase block is a last written word line of the open erase block.

(A3) In some embodiments of the method of any one of A1 to A2, the read command corresponds to a respective erase block in the non-volatile memory of the storage device and the first set of memory operation parameters are memory operation parameters determined in accordance with an age metric or performance metric for the respective erase block corresponding to the read command.

(A4) In some embodiments of the method of any one of A1 to A3, the method further includes: obtaining the second set of memory operation parameters from a lookup table.

(A5) In some embodiments of the method of any one of A1 to A4, the method further includes: prior to sending a read operation command to a non-volatile memory die to read data requested by the received read command, sending to the non-volatile memory die a precursor command to change a mode of reading data from the non-volatile memory, using the second set of memory operation parameters.

(A6) In some embodiments of the method of any one of A1 or A5, the method further includes: storing, in a status table in volatile memory, last written word line information for each open erase block in the non-volatile memory of the storage device.

(A7) In some embodiments of the method of any one of A6, determining whether the read command is for reading data from the predefined portion of an open erase block of the non-volatile memory includes performing a lookup in the status table.

(A8) In some embodiments of the method of any one of A6 or A7, the method further includes: removing information from the status table with respect to a particular erase block in conjunction with closing the particular erase block.

(A9) In some embodiments of the method of any one of A6 to A8, the status table is stored in volatile memory of a storage controller of the storage device.

(A10) In some embodiments of the method of any one of A6 to A8, the storage device includes a plurality of storage modules, each storage module having a local controller, a plurality of non-volatile memory devices and volatile memory in which a portion of the status table is stored.

(A11) In some embodiments of the method of A10, the read command is for reading data from a respective storage module of the plurality of storage modules, and determining whether the read command is for reading data from the predefined portion of an open erase block of the non-volatile memory includes performing a lookup in a corresponding portion of the status table in the respective storage module of the plurality of storage modules.

(A12) In some embodiments of the method of any one of A6 to A11, the method further includes: storing the status table in non-volatile memory of the storage device in response to detection of a power fail event.

(A13) In another aspect, a storage device includes non-volatile memory (e.g., one or more non-volatile storage devices, such as flash memory devices), one or more processors, and one or more controller modules. The one or more controller modules are configured to 1) receive a read command to read data from the non-volatile memory; 2) determine, in response to receiving the read command, whether the read command is for reading data from a predefined portion of an erase block of the non-volatile memory that is an open erase block; 3) read data from the non-volatile memory using a first set of memory operation parameters in response to a determination that the read command is not for reading data from the predefined portion of an open erase block of the non-volatile memory; and 4) read data from the non-volatile memory of the storage device using a second set of memory operation parameters that is different from the first set of memory operation parameters in response to a determination that the read command is for reading data from the predefined portion of an open erase block of the non-volatile memory.

(A14) In some embodiments of the storage device of A13, the one or more controller modules include: 1) a command module to receive the read command to read data from the non-volatile memory; 2) a status lookup module to determine, in response to the command module receiving the read command, whether the read command is for reading data from the predefined portion of an open erase block of the non-volatile memory; and 3) a data read module to: I) read data from the non-volatile memory using the first set of memory operation parameters in response to a determination that the read command is not for reading data from the predefined portion of an open erase block of the non-volatile memory; and ii) read data from the non-volatile memory of the storage device using a second set of memory operation parameters that is different from the first set of memory operation parameters in response to a determination that the read command is for reading data from the predefined portion of an open erase block of the non-volatile memory.

(A15) In some embodiments of the storage device of A13, the storage device further includes: a status table that stores last written word line information for each open erase block in the non-volatile memory of the storage device and a plurality of storage modules, each storage module having a local controller and a plurality of non-volatile memory devices. In some embodiments, a portion of the status table is stored in each of the storage modules.

(A16) In some embodiments of the storage device of A14, the storage device further includes: a status table that stores last written word line information for each open erase block in the non-volatile memory of the storage device and a plurality of storage modules. In some embodiments, each storage module of the plurality of storage modules includes: 1) a local controller including an instance of the status lookup module and an instance of the data read module, and 2) a plurality of non-volatile memory devices. In some embodiments, a portion of the status table is stored in each of the storage modules. In some embodiments, the read command is for reading data from a respective storage module of the plurality of storage modules. In some embodiments, determining whether the read command is for reading data from the predefined portion of an open erase block of the non-volatile memory includes performing a lookup in a corresponding portion of the status table in the respective storage module of the plurality of storage modules.

(A17) In some embodiments of the storage device of any one of A13 or A14, the one or more controller modules are further configured to perform the method of any one of A2 to A22 described above.

(A18) In some embodiments of the storage device of any one of A15 or A16, the one or more controller modules are further configured to perform the method of any one of A2 to A5, A8, and A12 described above.

(A19) In yet another aspect, a storage device includes non-volatile memory, one or more processors, and means for performing of the method of any one of A1 to A12 described above.

(A20) In yet another aspect, a non-transitory computer-readable storage medium stores one or more programs configured for execution by one or more processors of a storage device, the one or more programs for causing the storage device to perform the method of any one of A1 to A12 described above.

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure pertinent aspects of the embodiments described herein.

FIG. 1A is a block diagram illustrating an implementation of a data storage system 100, in accordance with some embodiments. While some example features are illustrated, various other features have not been illustrated for the sake of brevity and so as not to obscure pertinent aspects of the example embodiments disclosed herein. To that end, as a non-limiting example, data storage system 100 includes a storage device 120 (also sometimes called an information storage device, or a data storage device, or a memory device), which includes a storage controller 124 and a storage medium 132, and is used in conjunction with or includes a computer system 110 (e.g., a host system or a host computer). In some embodiments, storage medium 132 is a single flash memory device while in other embodiments storage medium 132 includes a plurality of flash memory devices. In some embodiments, storage medium 132 is NAND-type flash memory or NOR-type flash memory. In some embodiments, storage medium 132 includes one or more three-dimensional (3D) memory devices. Further, in some embodiments, storage controller 124 is a solid-state drive (SSD) controller. However, other types of storage media may be included in accordance with aspects of a wide variety of embodiments (e.g., PCRAM, ReRAM, STT-RAM, etc.). In some embodiments, a flash memory device includes one or more flash memory die, one or more flash memory packages, one or more flash memory channels or the like. In some embodiments, data storage system 100 can contain one or more storage devices 120.

Computer system 110 is coupled to storage controller 124 through data connections 101. However, in some embodiments computer system 110 includes storage controller 124, or a portion of storage controller 124, as a component and/or as a subsystem. For example, in some embodiments, some or all of the functionality of storage controller 124 is implemented by software executed on computer system 110. Computer system 110 may be any suitable computer device, such as a computer, a laptop computer, a tablet device, a netbook, an internet kiosk, a personal digital assistant, a mobile phone, a smart phone, a gaming device, a computer server, or any other computing device. Computer system 110 is sometimes called a host, host system, client, or client system. In some embodiments, computer system 110 is a server system, such as a server system in a data center. In some embodiments, computer system 110 includes one or more processors, one or more types of memory, a display and/or other user interface components such as a keyboard, a touch-screen display, a mouse, a track-pad, a digital camera, and/or any number of supplemental I/O devices to add functionality to computer system 110. In some embodiments, computer system 110 does not have a display and other user interface components.

Storage medium 132 is coupled to storage controller 124 through connections 103. Connections 103 are sometimes called data connections, but typically convey commands in addition to data, and optionally convey metadata, error correction information and/or other information in addition to data values to be stored in storage medium 132 and data values read from storage medium 132. In some embodiments, however, storage controller 124 and storage medium 132 are included in the same device (i.e., an integrated device) as components thereof. Furthermore, in some embodiments, storage controller 124 and storage medium 132 are embedded in a host device (e.g., computer system 110), such as a mobile device, tablet, other computer or computer controlled device, and the methods described herein are performed, at least in part, by the embedded storage controller. Storage medium 132 may include any number (i.e., one or more) of memory devices including, without limitation, non-volatile semiconductor memory devices, such as flash memory device(s). For example, flash memory device(s) can be configured for enterprise storage suitable for applications such as cloud computing, for database applications, primary and/or secondary storage, or for caching data stored (or to be stored) in secondary storage, such as hard disk drives. Additionally and/or alternatively, flash memory device(s) can also be configured for relatively smaller-scale applications such as personal flash drives or hard-disk replacements for personal, laptop, and tablet computers.

Storage medium 132 is divided into a number of addressable and individually selectable blocks, such as selectable portion 133. In some embodiments, the individually selectable blocks are the minimum size erasable units in a flash memory device. In other words, each block contains the minimum number of memory cells that can be erased without erasing any other memory cells in the same flash memory device. Typically, when a flash memory block is erased, all memory cells in the block are erased simultaneously. Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector, which is a subunit of a page. That is, a block includes a plurality of pages, each page contains a plurality of sectors, and each sector is the minimum unit of data for reading data from the flash memory device. For example, in some implementations, each block includes a number of pages, such as 64 pages, 128 pages, 256 pages or another suitable number of pages. Blocks are typically grouped into a plurality of zones. Each block zone can be independently managed to some extent, which increases the degree of parallelism for parallel operations and simplifies management of storage medium 132.

Additionally, if data is written to a storage medium in pages, but the storage medium is erased in blocks, pages in the storage medium may contain invalid (e.g., stale) data, but those pages cannot be overwritten until the whole block containing those pages is erased. In order to write to the pages with invalid data, the pages (if any) with valid data in that block are read and re-written to a new block and the old block is erased (or put on a queue for erasing). This process is called garbage collection. After garbage collection, the new block contains the pages with valid data and may have free pages that are available for new data to be written, and the old block can be erased so as to be available for new data to be written. Since flash memory can only be programmed and erased a limited number of times, the efficiency of the algorithm used to pick the next block(s) to re-write and erase has a significant impact on the lifetime and reliability of flash-based storage systems.

Another phenomenon that impacts the lifetime and reliability of flash-based storage systems (in some embodiments, storage medium 132) is write amplification. Write amplification is a phenomenon where the actual amount of physical data written to a storage medium (e.g., NVM devices 140, 142 in storage device 120) is a multiple of the logical amount of data written by a host (e.g., computer system 110, sometimes called a host) to the storage medium. As discussed above, when a block of storage medium must be erased before it can be re-written, the garbage collection process to perform these operations results in re-writing data one or more times. This multiplying effect increases the number of writes required over the life of a storage medium, which shortens the time it can reliably operate. The formula to calculate the write amplification of a storage system is given by equation:

$$\frac{\text{amount of data written to storage medium}}{\text{amount of data written by a host}}$$

One of the goals of any flash memory based data storage system architecture is to reduce write amplification as much as possible so that available endurance is used to meet storage medium reliability and warranty specifications. Higher system endurance also results in lower cost as the storage system may need less over-provisioning, where over-provisioning is storage capacity in a storage device or system that is in excess of the declared capacity of the storage device or system. By reducing write amplification, the endurance of the storage medium is increased and the overall cost of the storage system is decreased. Generally, garbage collection is performed on erase blocks with the fewest number of valid pages for best performance and best write amplification.

Continuing with the description of FIG. 1A, in some embodiments, storage controller 124 includes a management module 121-1, a host interface 129, a storage medium (I/O) interface 128, and additional module(s) 125. Storage controller 124 may include various additional features that have not been illustrated for the sake of brevity and so as not to obscure pertinent features of the example embodiments disclosed herein, and a different arrangement of features may be possible.

Host interface 129 provides an interface to computer system 110 through data connections 101. Similarly, storage medium interface 128 provides an interface to storage medium 132 though connections 103. In some embodiments, storage medium interface 128 includes read and write circuitry, including circuitry capable of providing reading signals to storage medium 132 (e.g., reading threshold voltages for NAND-type flash memory, as discussed below). In some embodiments, connections 101 and connections 103 are implemented as a communication media over which commands and data are communicated, using a protocol such as DDR3, SCSI, SATA, SAS, or the like. In some embodiments, storage controller 124 includes one or more processing units (also sometimes called CPUs, processors, microprocessors, or microcontrollers) configured to execute instructions in one or more programs (e.g., in storage controller 124). In some embodiments, the one or more processors are shared by one or more components within, and in some cases, beyond the function of storage controller 124.

In some embodiments, management module 121-1 includes one or more central processing units (CPUs, also sometimes called processors, microprocessors, or microcontrollers) 122 configured to execute instructions in one or more programs (e.g., in management module 121-1). In some embodiments, the one or more CPUs 122 are shared by one or more components within, and in some cases, beyond the function of storage controller 124. Management module 121-1 is coupled to host interface 129, additional module(s) 125 and storage medium interface 128 in order to coordinate the operation of these components. In some embodiments, one or more modules of management module 121-1 are implemented in management module 121-2 of computer system 110. In some embodiments, one or more processors of computer system 110 (not shown) are configured to execute instructions in one or more programs (e.g., in management module 121-2). Management module 121-2 is coupled to storage device 120 in order to manage the operation of storage device 120.

Additional module(s) 125 are coupled to storage medium interface 128, host interface 129, and management module 121-1. As an example, additional module(s) 125 may include an error control module to limit the number of uncorrectable errors inadvertently introduced into data during writes to memory and/or reads from memory. In some embodiments, additional module(s) 125 are executed in software by the one or more CPUs 122 of management module 121-1, and, in other embodiments, additional module(s) 125 are implemented in whole or in part using special purpose circuitry (e.g., to perform encoding and decoding functions). In some embodiments, additional module(s) 125 are implemented in whole or in part by software executed on computer system 110.

As data storage densities of non-volatile semiconductor memory devices continue to increase, stored data is more prone to being stored and/or read erroneously. In some embodiments, error control coding can be utilized to limit the number of uncorrectable errors that are introduced by electrical fluctuations, defects in the storage medium, operating conditions, device history, write-read circuitry, etc., or a combination of these and various other factors.

In some embodiments, an error control module, included in additional module(s) 125, includes an encoder and a decoder. In some embodiments, the encoder encodes data by applying an error control code (ECC) to produce a codeword, which is subsequently stored in storage medium 132. When encoded data (e.g., one or more codewords) is read from storage medium 132, the decoder applies a decoding process to the encoded data to recover the data, and to correct errors in the recovered data within the error correcting capability of the error control code. Those skilled in the art will appreciate that various error control codes have different error detection and correction capacities, and that particular codes are selected for various applications for reasons beyond the scope of this disclosure. As such, an exhaustive review of the various types of error control codes is not provided herein. Moreover, those skilled in the art will appreciate that each type or family of error control codes may have encoding and decoding algorithms that are particular to the type or family of error control codes. On the other hand, some algorithms may be utilized at least to some extent in the decoding of a number of different types or families of error control codes. As such, for the sake of brevity, an exhaustive description of the various types of encoding and decoding algorithms generally available and known to those skilled in the art is not provided herein.

In some embodiments, during a write operation, host interface 129 receives data to be stored in storage medium 132 from computer system 110. The data received by host interface 129 is made available to an encoder (e.g., in additional module(s) 125), which encodes the data to produce one or more codewords. The one or more codewords are made available to storage medium interface 128, which transfers the one or more codewords to storage medium 132 in a manner dependent on the type of storage medium being utilized.

In some embodiments, a read operation is initiated when computer system (host) 110 sends one or more host read commands (e.g., via data connections 101, or alternatively a separate control line or bus) to storage controller 124 requesting data from storage medium 132. Storage controller 124 sends one or more read access commands to storage medium 132, via storage medium interface 128, to obtain raw read data in accordance with memory locations (or logical addresses, object identifiers or the like) specified by the one or more host read commands. Storage medium interface 128 provides the raw read data (e.g., comprising one or more codewords) to a decoder (e.g., in additional module(s) 125). If the decoding is successful, the decoded data is provided to host interface 129, where the decoded data is made available to computer system 110. In some embodiments, if the decoding is not successful, storage controller 124 may resort to a number of remedial actions or provide an indication of an irresolvable error condition.

As explained above, a storage medium (e.g., NVM devices 140, 142) is divided into a number of addressable and individually selectable blocks and each block is optionally (but typically) further divided into a plurality of pages and/or word lines and/or sectors. While erasure of a storage medium is performed on a block basis, in many embodiments, reading and programming of the storage medium is performed on a smaller subunit of a block (e.g., on a page basis, word line basis, or sector basis). In some embodiments, the smaller subunit of a block consists of multiple memory cells (e.g., single-level cells or multi-level cells). In some embodiments, programming is performed on an entire page. In some embodiments, a multi-level cell (MLC) NAND flash typically has four possible states per cell, yielding two bits of information per cell. Further, in some embodiments, a MLC NAND has two page types: (1) a lower page (sometimes called fast page), and (2) an upper page (sometimes called slow page). In some embodiments, a triple-level cell (TLC) NAND flash has eight possible states per cell, yielding three bits of information per cell. Although the description herein uses TLC, MLC, and SLC as examples, those skilled in the art will appreciate that the embodiments described herein may be extended to memory cells that have more than eight possible states per cell, yielding more than three bits of information per cell. In some embodiments, the encoding format of the storage media (i.e., TLC, MLC, or SLC and/or a chosen data redundancy mechanism) is a choice made (or implemented) when data is actually written to the storage media.

Flash memory devices (in some embodiments, storage medium 132) utilize memory cells (e.g., SLC, MLC, and/or TLC) to store data as electrical values, such as electrical charges or voltages. Each flash memory cell typically includes a single transistor with a floating gate that is used to store a charge, which modifies the threshold voltage of the transistor (i.e., the voltage needed to turn the transistor on). The magnitude of the charge, and the corresponding threshold voltage the charge creates, is used to represent one or more data values. In some embodiments, during a read operation, a reading threshold voltage is applied to the control gate of the transistor and the resulting sensed current or voltage is mapped to a data value.

The terms "cell voltage" and "memory cell voltage," in the context of flash memory cells, mean the threshold voltage of the memory cell, which is the minimum voltage that needs to be applied to the gate of the memory cell's transistor in order for the transistor to conduct current. Similarly, reading threshold voltages (sometimes also called reading signals and reading voltages) applied to flash memory cells are gate voltages applied to the gates of the flash memory cells to determine whether the memory cells conduct current at that gate voltage. In some embodiments, when a flash memory cell's transistor conducts current at a given reading threshold voltage, indicating that the cell voltage is less than the reading threshold voltage, the raw data value for that read operation is a "1" and otherwise the raw data value is a "0."

Figure 1B:
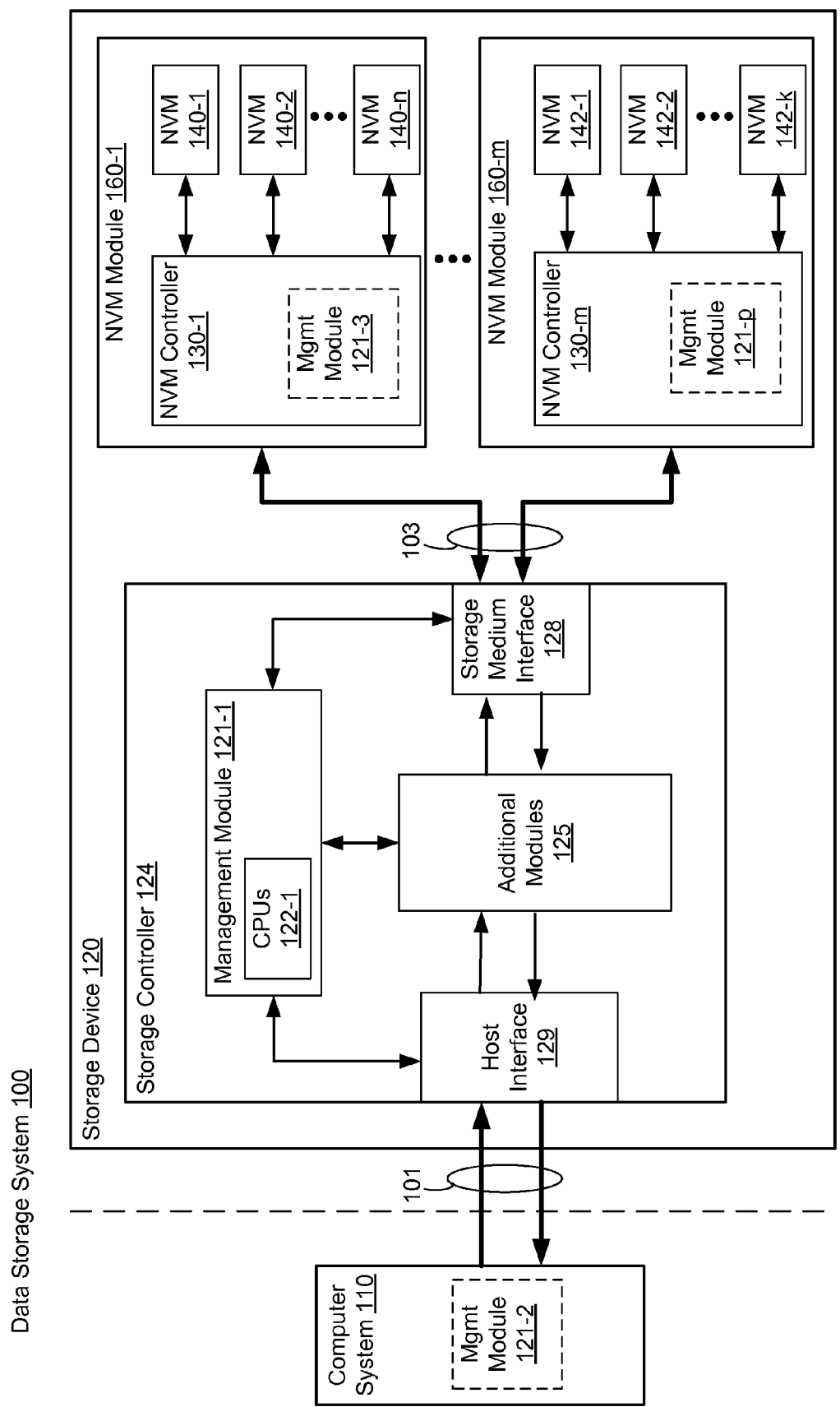

Attention is now directed to FIG. 1B, illustrating a block diagram of an implementation of a data storage system 100, in accordance with some embodiments. To avoid needless repetition of explanations already provided above, features and components of data storage system 100 already shown in FIG. 1A and described above, and shown again in FIG. 1B, are not described again here, and instead only additional features and components are described with respect to FIG. 1B. Additionally, some components illustrated in FIG. 1A are, in some embodiments, still a part of the implementation illustrated in FIG. 1B, although not explicitly illustrated. For example, NVM Modules 160, in some embodiments are included as components of storage medium 132 (FIG. 1A). As such, the features and components of storage medium 132, described above with respect to in FIG. 1A, are in some embodiments also applicable to NVM devices 140, 142 contained within NVM Modules 160. In some embodiments in which data storage system 100 includes a plurality of storage devices 120, one or more of the storage devices are configured as illustrated in FIG. 1B, while other storage devices are configured as illustrated in FIG. 1A.

As a non-limiting example, data storage system 100 includes storage device 120, which includes one or more NVM modules (e.g., NVM modules(s) 160). Each NVM module 160 includes one or more NVM module controllers (e.g., NVM module controllers 130-1 through 130-m), and one or more NVM devices (e.g., one or more NVM device(s) 140, 142).

In this non-limiting example, data storage system 100 is used in conjunction with computer system 110. In some implementations, storage device 120 includes a single NVM device while in other implementations storage device 120 includes a plurality of NVM devices. In some implementations, NVM devices 140, 142 include NAND-type flash memory or NOR-type flash memory. Further, in some implementations, each NVM module controller 130 is or includes a solid-state drive (SSD) controller. However, one or more other types of storage media may be included in accordance with aspects of a wide variety of implementations.

In some embodiments, the one or more NVM controllers 130 are coupled with storage controller 124 through connections 103. Connections 103 are sometimes called data connections, but typically convey commands in addition to data, and optionally convey metadata, error correction information, and/or other information in addition to data values to be stored in NVM devices 140, 142 and data values read from NVM devices 140, 142. In some embodiments, however, storage controller 124, the one or more NVM controllers 130, and NVM devices 140, 142 are included in the same device (i.e., an integrated device such as storage medium 132 of FIG. 1A) as components thereof. Furthermore, in some embodiments, storage controller 124 is embedded in a host device (e.g., computer system 110), such as a mobile device, tablet, other computer or computer controlled device, and the methods described herein are performed, at least in part, by the embedded storage controller.

In some embodiments, one or more NVM modules 160 include NVM devices 140, 142 such as flash memory devices (e.g., NVM devices 140-1 through 140-n, and NVM devices 142-1 through 142-k) and NVM controllers 130 (e.g., NVM controllers 130-1 through 130-m). Viewed another way, storage device 120 includes m memory channels, each of which has an NVM controller 130 and a set of NVM devices 140 or 142 coupled to the NVM controller 130, where m is an integer greater than one. However, in some embodiments, two or more memory channels share an NVM controller 130. In either example, each memory channel has its own distinct set of NVM devices 140 or 142. In a non-limiting example, the number of memory channels in a typical NVM module is 8, 16 or 32. In another non-limiting example, the number of NVM devices 140 or 142 per memory channel is typically 8, 16, 32 or 64. Furthermore, in some embodiments, the number of NVM devices 140/142 is different in different memory channels.

In some embodiments, the NVM modules 160 each include a portion of cache memory, for example implementing a write cache, while in other embodiments only storage controller 124 implements a write cache. In some embodiments, each NVM module controller 130 optionally includes a management module 121 (e.g., management module 121-3 of NVM controller 130-1). The management modules 121 of the NVM modules 160 also, in some embodiments, include one or more CPUs 234 (FIG. 2B).

In some embodiments, management module 121-3 of NVM controller 130-1 of NVM module 160-1 performs or shares some of the tasks typically performed by management module 121-1 of storage controller 124. For example, in some embodiments, management module 121-3 monitors the status of executing commands at NVM 140-1 to 140-n, instead of management module 121-1 performing this function (as discussed in more detail below). In some embodiments, management module 121-3 monitors a portion of NVM devices 140, while management module 121-1 of storage controller 124 monitors the remainder of NVM devices 140. In some embodiments, management module 121-3 monitors a portion of NVM devices 140 (e.g., all NVM devices associated with the NVM controller of which management module 121-3 is a component), and other management modules 121 associated with other NVM modules 160 monitor the remaining NVM devices 140.

Figure 2A:
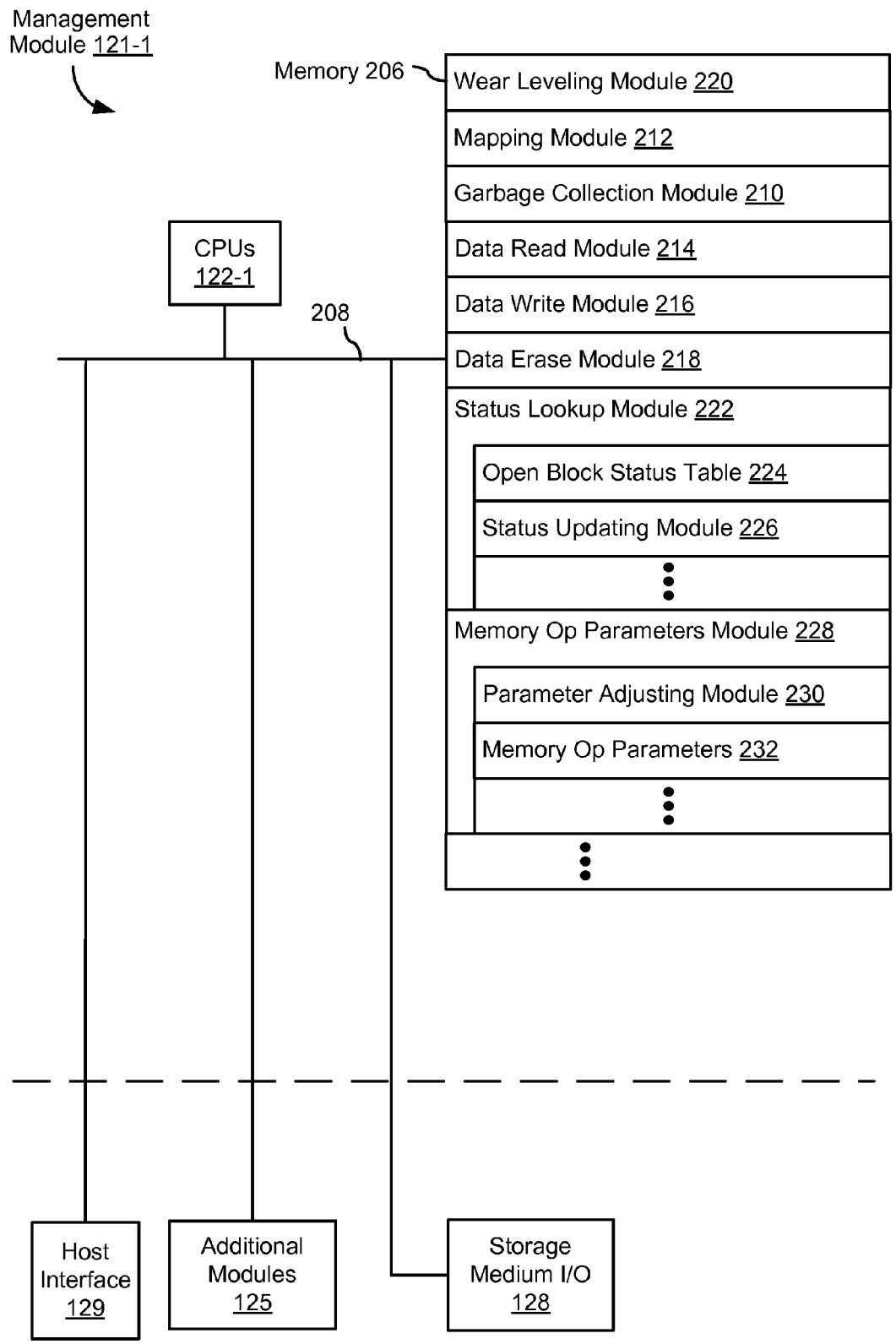
FIGS. 2A and 2B are block diagrams illustrating implementations of management modules in accordance with some embodiments.
Figure 2B:
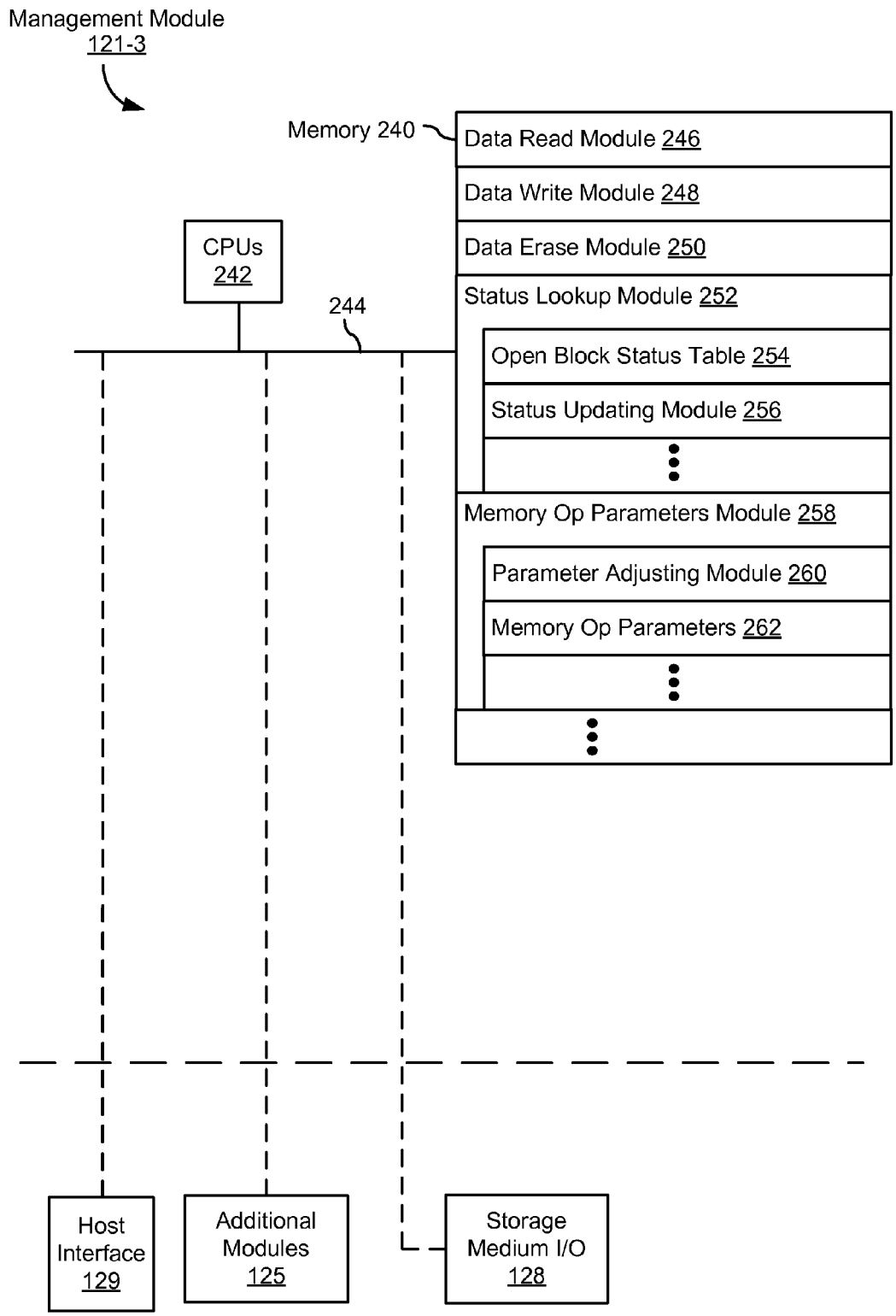

FIG. 2A is a block diagram illustrating a management module 121-1, in accordance with some embodiments, as shown in FIGS. 1A and 1B. Management module 121-1 typically includes one or more processing units (sometimes called CPUs or processors) 122-1 for executing modules, programs, and/or instructions stored in memory 206 (and thereby performing processing operations), memory 206 (sometimes called controller memory), and one or more communication buses 208 for interconnecting these components. The one or more communication buses 208 optionally include circuitry (sometimes called a chipset) that interconnects and controls communications between system components. Management module 121-1 is coupled to host interface 129, additional module(s) 125, and storage medium I/O 128 by the one or more communication buses 208.

Memory 206 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206 optionally includes one or more storage devices remotely located from the CPU(s) 122-1. Memory 206, or alternatively the non-volatile memory device(s) within memory 206, comprises a non-transitory computer readable storage medium.

In some embodiments, memory 206, or the non-transitory computer-readable storage medium of memory 206 stores the following programs, modules, and data structures, or a subset or superset thereof:

- wear leveling module 220 for determining pages or blocks of storage device 120 for storing data so as to evenly wear the pages or blocks of storage device 120;
- mapping module 212 that is used for mapping (e.g., using a mapping table) logical addresses in a logical address space to physical addresses, and for maintaining and updating one or more address mapping tables and/or related data structures;
- garbage collection module 210 that is used for garbage collection for one or more blocks in a storage medium (e.g., storage medium 132, FIG. 1A or NVM devices 140, 142, FIG. 1B);
- data read module 214 that is used for reading data from one or more codewords, pages, or blocks in a storage medium (e.g., storage medium 132, FIG. 1A or NVM devices 140, 142, FIG. 1B);
- data write module 216 that is used for writing data to one or more codewords, pages, or blocks in a storage medium (e.g., storage medium 132, FIG. 1A or NVM devices 140, 142, FIG. 1B);
- data erase module 218 that is used for erasing data from one or more blocks in a storage medium (e.g., storage medium 132, FIG. 1A or NVM devices 140, 142, FIG. 1B);
- status lookup module 222 that is used for monitoring open blocks (e.g., open erase blocks) within memory portions (e.g., physical die of NVM devices 140, 142) of storage device 120, optionally including:
  - open block status table 224 that is used for storing information about the status of open blocks and information about predefined portions within each open block (e.g., information identifying a location within each open block corresponding to a last written word line);
  - status updating module 226 for adding, updating and/or removing information about the status of open blocks (and predefined portions of the open blocks) within storage device 120 that are being monitored by status lookup module 222 (e.g., updating last written word line information for a particular open block in conjunction with data write module 216 performing a write operation at the particular open block, or removing information with respect to a particular erase block in conjunction with closing the particular erase block).

memory operation ("op") parameters module 228 that is used for retrieving and adjusting memory operation parameters, optionally including:

parameter adjusting module 230 for adjusting memory operation parameters (e.g., communicating with data read module 214 to adjust one or more memory operation parameters, corresponding to a read command, in accordance with an age metric or a performance metric for a respective erase block corresponding to the read command); and/or memory operation parameters 232 for storing a plurality of sets of memory operation parameters (e.g., one set of memory operation parameters for read commands requesting to read data from a predefined portion (e.g., last written word line) of an open block and a different set of memory operation parameters for read commands requesting to read data from closed blocks and other portions of open blocks).

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the non-transitory computer readable storage medium of memory 206, provide instructions for implementing some of the methods described below. In some embodiments, some or all of these modules may be implemented with specialized hardware circuits that subsume part or all of the module functionality.

Although FIG. 2A shows management module 121-1 in accordance with some embodiments, FIG. 2A is intended more as a functional description of the various features which may be present in management module 121-1 than as a structural schematic of the embodiments described herein. In practice, and as recognized by those of ordinary skill in the art, the programs, modules, and data structures shown separately could be combined and some programs, modules, and data structures could be separated.

FIG. 2B is a block diagram illustrating management module 121-3, in accordance with some embodiments, as shown in FIG. 1B. Management module 121-3 typically includes one or more processing units (sometimes called central processing units, CPUs, or processors) 242 for executing modules, programs and/or instructions stored in memory 240 and thereby performing processing operations, memory 240 (sometimes called controller memory or NVM controller memory), and one or more communication buses 244 for interconnecting these components. The one or more communication buses 244 optionally include circuitry (sometimes called a chipset) that interconnects and controls communications between system components. Management module 121-3 is optionally coupled to one or more of host interface 129, additional module(s) 125, and storage medium I/O 128 by the one or more communication buses 244.

Memory 240 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 240 optionally includes one or more storage devices remotely located from the CPU(s) 242. Memory 240, or alternatively the non-volatile memory device(s) within memory 240, comprises a non-transitory computer-readable storage medium.

In some embodiments, memory 240, or the non-transitory computer-readable storage medium of memory 240 stores the following programs, modules, and data structures, or a subset or superset thereof:

data read module 246 that is used for reading data from one or more codewords, pages, or blocks in a NVM module (e.g., one or more NVM devices 140 of NVM module 160-1, FIG. 1B);

data write module 248 that is used for writing data to one or more codewords, pages, or blocks in a NVM module (e.g., one or more NVM devices 140 of NVM module 160-1);

data erase module 250 that is used for erasing data from one or more blocks in a NVM module (e.g., one or more NVM devices 140 of NVM module 160-1);

status lookup module 252 that is used for monitoring open blocks (e.g., open erase blocks) within memory portions (e.g., physical die of NVM devices 140, 142) of a particular NVM module (e.g., any of module 160-1 to 160-*m*) in storage device 120, optionally including:

open block status table 254 (or a portion of open block status table 224 corresponding to NVM devices within a particular NVM module) that is used for storing information about the status of open blocks and information about predefined portions within each open block (e.g., information identifying a location within each open block corresponding to a last written word line);

status updating module 256 for adding, updating and/or removing information about the status of open blocks (and predefined portions of the open blocks) within storage device 120 that are being monitored by status lookup module 252 (e.g., updating last written word line information for a particular open block in conjunction with data write module 216 or 248 performing a write operation at the particular open block, or removing information with respect to a particular erase block in conjunction with closing the particular erase block).

memory operation ("op") parameters module 258 that is used for retrieving and adjusting memory operation parameters, optionally including:

parameter adjusting module 260 for adjusting memory operation parameters (e.g., communicating with data read module 214 or 246 to adjust one or more memory operation parameters, corresponding to a read command, in accordance with an age metric or a performance metric for a respective erase block corresponding to the read command); and memory operation parameters 262 for storing a plurality of sets of memory operation parameters (e.g., one set of memory operation parameters for read commands requesting to read data from a predefined portion (e.g., last written word line) of an open block and a different set of memory operation parameters for read commands requesting to read data from closed blocks and other portions of open blocks).

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 240 may store a subset of the modules and data structures identified above. Furthermore, memory 240 may store additional modules and data structures not described above. In some embodiments, the programs, modules, and data structures stored in memory 240, or the non-transitory computer readable storage medium of memory 240, provide instructions for implementing some of the methods described below. In some embodiments, some or all of these modules may be implemented with specialized hardware circuits that subsume part or all of the module functionality.

Although FIG. 2B shows management module 121-3 in accordance with some embodiments, FIG. 2B is intended more as a functional description of the various features which may be present in management module 121-3 than as a structural schematic of the embodiments described herein. In practice, and as recognized by those of ordinary skill in the art, the programs, modules, and data structures shown separately could be combined and some programs, modules, and data structures could be separated.

Figure 3A:
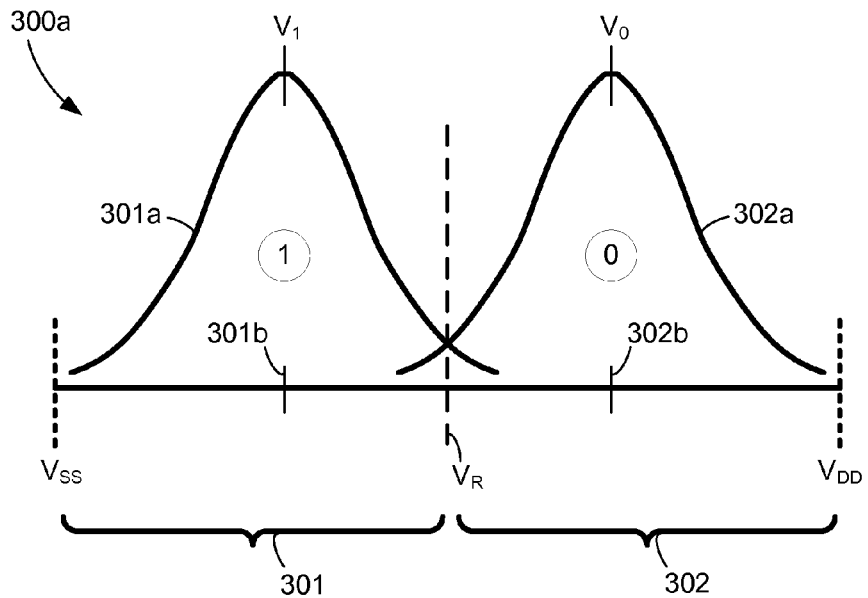
FIG. 3A is a simplified, prophetic diagram of voltage distributions 300a found in a single-level flash memory cell (SLC) over time, in accordance with some embodiments.

FIG. 3A is a simplified, prophetic diagram of voltage distributions 300a found in a single-level flash memory cell (SLC) over time, in accordance with some embodiments. The voltage distributions 300a shown in FIG. 3A have been simplified for illustrative purposes. In this example, the SLC's voltage range extends approximately from a voltage, $V_{SS}$, at a source terminal of an NMOS transistor to a voltage, $V_{DD}$, at a drain terminal of the NMOS transistor. As such, voltage distributions 300a extend between $V_{SS}$ and $V_{DD}$.

Sequential voltage ranges 301 and 302 between source voltage $V_{SS}$ and drain voltage $V_{DD}$ are used to represent corresponding bit values "1" and "0," respectively. Each voltage range 301, 302 has a respective center voltage $V_1$ 301b, $V_0$ 302b. As described below, in many circumstances the memory cell current sensed in response to an applied reading threshold voltage is indicative of a memory cell voltage different from the respective center voltage $V_1$ 301b or $V_0$ 302b corresponding to the respective bit value written into the memory cell. Errors in cell voltage, and/or the cell voltage sensed when reading the memory cell, can occur during write operations, read operations, or due to "drift" of the cell voltage between the time data is written to the memory cell and the time a read operation is performed to read the data stored in the memory cell. For ease of discussion, these effects are collectively described as "cell voltage drift." Each voltage range 301, 302 also has a respective voltage distribution 301a, 302a that may occur as a result of any number of a combination of error-inducing factors, examples of which are identified above.

In some implementations, a reading threshold voltage $V_R$ is applied between adjacent center voltages (e.g., applied proximate to the halfway region between adjacent center voltages $V_1$ 301b and $V_0$ 302b). Optionally, in some implementations, the reading threshold voltage is located between voltage ranges 301 and 302. In some implementations, reading threshold voltage $V_R$ is applied in the region proximate to where the voltage distributions 301a and 302a overlap, which is not necessarily proximate to the halfway region between adjacent center voltages $V_1$ 301b and $V_0$ 302b.

In order to increase storage density in flash memory, flash memory has developed from single-level (SLC) cell flash memory to multi-level cell (MLC) flash memory so that two or more bits can be stored by each memory cell. As discussed below with reference to FIG. 3B, a MLC flash memory device is used to store multiple bits by using voltage ranges within the total voltage range of the memory cell to represent different bit-tuples. A MLC flash memory device is typically more error-prone than a SLC flash memory device created using the same manufacturing process because the effective voltage difference between the voltages used to store different data values is smaller for a MLC flash memory device. Moreover, due to any number of a combination of factors, such as electrical fluctuations, defects in the storage medium, operating conditions, device history, and/or write-read circuitry, a typical error includes a stored voltage level in a particular MLC being in a voltage range that is adjacent to the voltage range that would otherwise be representative of the correct storage of a particular bit-tuple. As discussed in greater detail below with reference to FIG. 3B, the impact of such errors can be reduced by gray-coding the data, such that adjacent voltage ranges represent single-bit changes between bit-tuples.

Figure 3B:
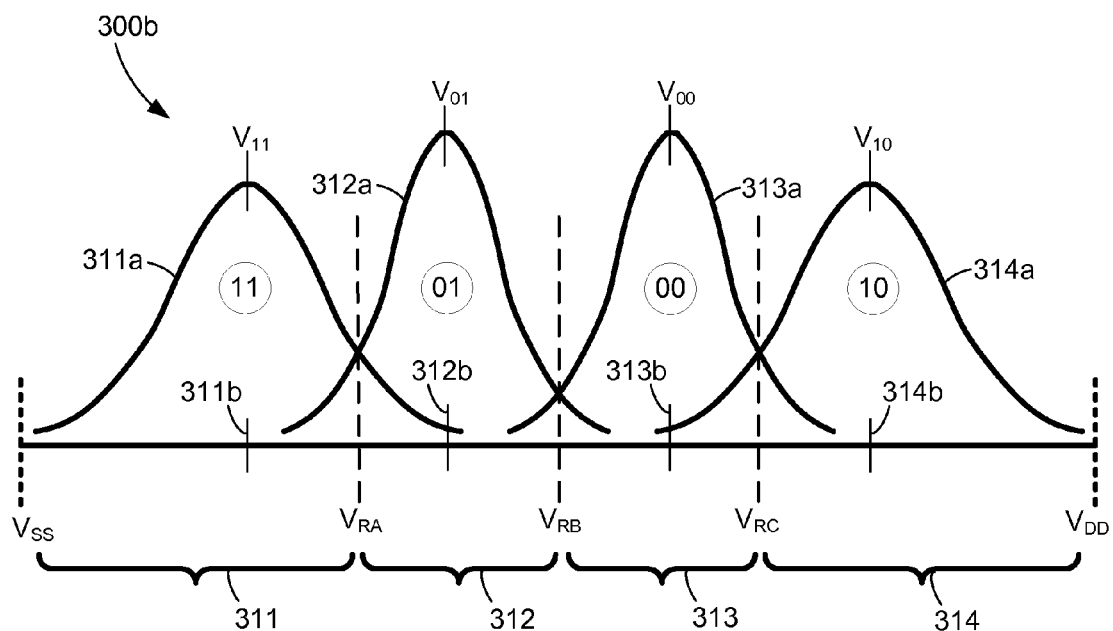
FIG. 3B is a simplified, prophetic diagram of voltage distributions 300b found in a multi-level flash memory cell (MLC) over time, in accordance with some embodiments.

FIG. 3B is a simplified, prophetic diagram of voltage distributions 300b found in a multi-level flash memory cell (MLC) over time, in accordance with some embodiments. The voltage distributions 300b shown in FIG. 3B have been simplified for illustrative purposes. The cell voltage of a MLC approximately extends from a voltage, $V_{SS}$, at the source terminal of a NMOS transistor to a voltage, $V_{DD}$, at the drain terminal. As such, voltage distributions 300b extend between $V_{SS}$ and $V_{DD}$.

Sequential voltage ranges 311, 312, 313, 314 between the source voltage $V_{SS}$ and drain voltages $V_{DD}$ are used to represent corresponding bit-tuples "11," "01," "00," "10," respectively. Each voltage range 311, 312, 313, 314 has a respective center voltage 311b, 312b, 313b, 314b. Each voltage range 311, 312, 313, 314 also has a respective voltage distribution 311a, 312a, 313a, 314a that may occur as a result of any number of a combination of factors, such as electrical fluctuations, defects in the storage medium, operating conditions, device history (e.g., number of program-erase (P/E) cycles), and/or imperfect performance or design of write-read circuitry.

Ideally, during a write operation, the charge on the floating gate of the MLC would be set such that the resultant cell voltage is at the center of one of the ranges 311, 312, 313, 314 in order to write the corresponding bit-tuple to the MLC. Specifically, the resultant cell voltage would be set to one of $V_{11}$ 311b, $V_{01}$ 312b, $V_{00}$ 313b and $V_{10}$ 314b in order to write a corresponding one of the bit-tuples "11," "01," "00" and "10." In reality, due to the factors mentioned above, the initial cell voltage may differ from the center voltage for the data written to the MLC.

Reading threshold voltages $V_{RA}$, $V_{RB}$ and $V_{RC}$ are positioned between adjacent center voltages (e.g., positioned at or near the halfway point between adjacent center voltages) and, thus, define threshold voltages between the voltage ranges 311, 312, 313, 314. During a read operation, one of the reading threshold voltages $V_{RA}$, $V_{RB}$ and $V_{RC}$ is applied to determine the cell voltage using a comparison process. However, due to the various factors discussed above, the actual cell voltage, and/or the cell voltage received when reading the MLC, may be different from the respective center voltage $V_{11}$ 311b, $V_{01}$ 312b, $V_{00}$ 313b or $V_{10}$ 314b corresponding to the data value written into the cell. For example, the actual cell voltage may be in an altogether different voltage range, strongly indicating that the MLC is storing a different bit-tuple than was written to the MLC. More commonly, the actual cell voltage may be close to one of the read comparison voltages, making it difficult to determine with certainty which of two adjacent bit-tuples is stored by the MLC.

Errors in cell voltage, and/or the cell voltage received when reading the MLC, can occur during write operations, read operations, or due to "drift" of the cell voltage between the time data is written to the MLC and the time a read operation is performed to read the data stored in the MLC. For ease of discussion, sometimes errors in cell voltage, and/or the cell voltage received when reading the MLC, are collectively called "cell voltage drift."

One way to reduce the impact of a cell voltage drifting from one voltage range to an adjacent voltage range is to gray-code the bit-tuples. Gray-coding the bit-tuples includes constraining the assignment of bit-tuples such that a respective bit-tuple of a particular voltage range is different from a respective bit-tuple of an adjacent voltage range by only one bit. For example, as shown in FIG. 3B, the corresponding bit-tuples for adjacent ranges 301 and 302 are respectively "11" and "01," the corresponding bit-tuples for adjacent ranges 302 and 303 are respectively "01" and "00," and the corresponding bit-tuples for adjacent ranges 303 and 304 are respectively "00" and "10." Using gray-coding, if the cell voltage drifts close to a read comparison voltage level, the error is typically limited to a single bit within the 2-bit bit-tuple.

Although the description of FIG. 3B uses an example in which q=2 (i.e., 2 bits per cell in a MLC flash memory), those skilled in the art will appreciate that the embodiments described herein may be extended to memory cells that have more than four possible states per cell, yielding more than two bits of information per cell. For example, in some embodiments, a triple-level memory cell (TLC) has eight possible states per cell, yielding three bits of information per cell. As another example, in some embodiments, a quad-level memory cell (QLC) has 16 possible states per cell, yielding four bits of information per cell. As another example, in some embodiments, a cell might store only 6 states, yielding approximately 2.5 bits of information per cell, meaning that two cells together would provide 36 possible states, more than sufficient to store 5 bits of information per pair of cells.

In some embodiments, the last written portion (e.g., word line) of an erase block is not as "fully written" as previously written word lines, due to the impact that writing data on word line has on the voltage distributions of data stored in a neighboring word line. As result, in some embodiments, more accurate read operations (e.g., lower error read operations) for reading data from the last written portion of an erase block word line can be performed by using one or more reading thresholds $V_R$ that are lower (shifted to the left, in FIG. 3A or 3B) than the default reading thresholds used to read other data in the same erase block.

Figure 3C:
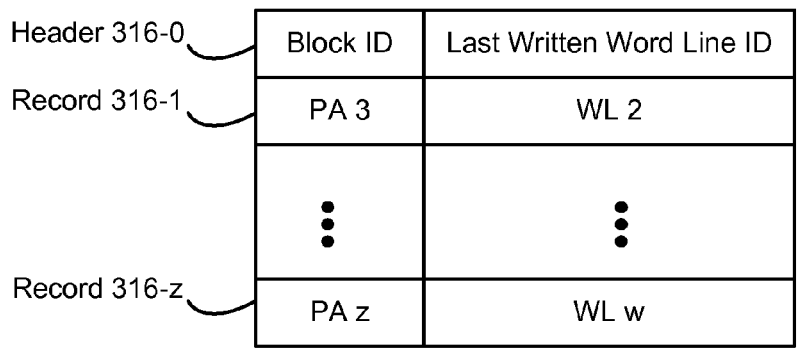
FIG. 3C is a block diagram illustrating a status table and, more specifically, an open block status table, in accordance with some embodiments.

FIG. 3C is a block diagram illustrating a status table and, more specifically, an open block status table, in accordance with some embodiments. In some embodiments, one or more open block status tables (e.g., open block status table 224 and/or open block status table 254) are used to store information about the status of open blocks in a storage device and information about predefined portions within each open block (e.g., information identifying a location within each open block corresponding to a last written word line).

For example, as illustrated in FIG. 3C, an open block status table contains records 316-1 through 316-z and optionally contains a header 316-0. Header 316-0, in some embodiments, contains a brief description of each field of information (e.g., each field of the database records) stored within the open block status table. In this non-limiting example, header 316-0 contains fields for "Block ID" (e.g., a block identifier, such as a physical address within a storage device or a pointer to the physical address) and "Last Written Word Line ID" (e.g., a word line identifier, such as a physical address of a predefined portion of an erase block that is an open erase block or a pointer to the physical address). In some embodiments, each record 316-1 through 316-z contains one or more additional fields, such as a "timestamp" field that identifies when the last write command was performed at the open erase block associated with each record, a "read parameters" field that includes a data structure or object (or a pointer to a data structure or object, such as a pointer to an object stored within memory operation parameters 232 and/or memory operation parameters 262) containing one or more memory operation parameters for reading data from the last written word line associated with each record, and/or a "last written by" field that identifies a component of data storage system 100 (FIG. 1A or 1B) that initiated the last write command (e.g., a host, such as computer system 110, or a module within a storage device, such as garbage collection module 210 of management module 121-1).

As pictured in FIG. 3C, records 316-1 through 316-z contain open block status information corresponding to erase blocks in a storage device. In some embodiments, a single open block status table (e.g., open block status table 224) contains open block status information for all erase blocks in a storage device. In some embodiments, a plurality of open block status tables (e.g., instances of open block status table 254 in different NMV modules 160) are maintained, each respective open block status table containing open block status information associated with a specific component of data storage system 100. For example, in some embodiments of the data storage system 100 shown in FIG. 1B, a separate open block status table 254 is maintained for each NVM module 160-1 to 160-m.

Figure 3D:
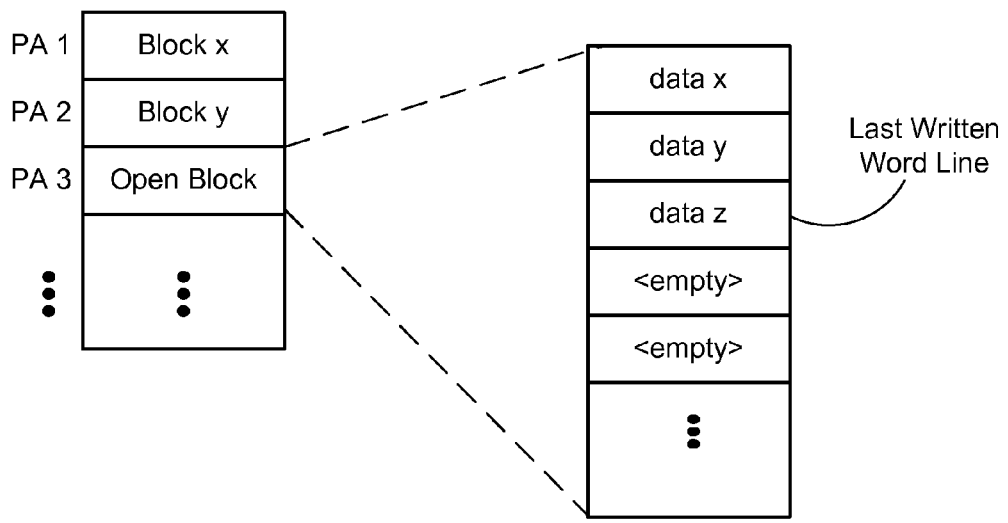
FIG. 3D is a block diagram illustrating a memory portion and, more specifically, a memory portion with an open block.

Continuing with the example pictured in FIGS. 3C and 3D, Record 316-1 indicates that an erase block located at physical address 3 (e.g., PA 3 of memory portion 320, FIG. 3D) is an open erase block (i.e., an erase block containing empty/unwritten portions, as illustrated by the "<empty>" portions of PA 3 within memory portion 320, FIG. 3D) that has a last written word line "WL 2" (e.g., a last written word line is a predefined portion (in some embodiments, 1, 2 or 3 pages) of the memory portion 320. In this example, the word line specified by Record 316-1 is the last portion of the specified memory portion with written data and all predefined portions of the specified memory portion that follow the last written word line are empty/unwritten.

In some embodiments, the block identifier in each record 314 (e.g., "PA 3" in Record 316-1) is a physical address that indicates a location of the open erase block in a non-volatile storage device. In other embodiments, the block identifier is a relative physical address, also called an offset, that indicates that the physical address of the open erase block associated with the record 314 is offset from an initial physical address (e.g., a first physical address representing the location at which the erase blocks on a particular non-volatile memory die begin) by a specified number of erase blocks. In some embodiments, the word line identifier (e.g., "WL 2") in each record 314 is an identifier (such as a physical address, also called an offset or relative physical address or local physical address, that indicates where the word line begins within the open erase block, e.g., a physical address that identifies the location of a first page of the word line) for a predefined portion of an open erase block. In some other embodiments, the block identifier and word line identifier in a respective record 314 contain pointers to the physical addresses (or to the first physical addresses) of the open erase block and the last written word line of the open erase block, respectively.

Each record contained within the open block status table is maintained by a status lookup module (e.g., status lookup module 222, FIG. 2A and/or status lookup module 252, FIG. 2B) and/or a status updating module (e.g., status updating module 226, FIG. 2A and/or status updating module 256, FIG. 2B) in a storage controller. For example, in accordance with a determination (e.g., by data write module 216 or data write module 248) that data being written (or already written) to an erase block will leave one or more predefined portions (e.g., word lines) in an unwritten state (in other words, the data is not of a large enough size to fill all predefined portions within the erase block and, thus, one or more of the predefined portions will not be updated during/after the write operation), then the status updating module will add a record to the open block status table that identifies the erase block that is now an open erase block and the last written word line of the open erase block. Furthermore, in accordance with a determination (e.g., by data write module 216 or data write module 248) that a write command will close (or already did close) an open erase block, the status updating module removes information associated with the open erase block from the open block status table (e.g., by deleting a record from the open block status table, or marking the record as inactive or invalid, or erasing information in the record, or replacing information in the record with null information).

Additionally, in some embodiments, in accordance with a determination (e.g., by data erase module 218, data erase module 250, and/or garbage collection module 210) that an erase operation (or a garbage collection operation that includes an erase operation) is for an open erase block, then the status updating module will remove information associated with the open erase block from the open block status table (e.g., using any of the methodologies described above). In some embodiments, updating of the open block status table is performed (e.g., scanning the open block status table to locate a record that requires an update and performing the required update on the record) after completion of a memory operation (e.g., a write or erase operation), so that the execution time of the memory operation is unaffected by the time required to update the open block status table.

In some embodiments, one data structure (e.g., one table, database, linked list, text file, etc.) is used to store information about all open erase blocks in a particular storage medium (e.g., storage medium 132, FIG. 1A or NVM devices 140, 142, FIG. 1B). For example, open block status table 224 is used, in these embodiments, to store status information about all open erase blocks in storage medium 132. In some embodiments, only information about open erase blocks in active portions of the particular storage medium (e.g., active superblocks) is stored in the open block status table.

In some other embodiments, one data structure is used for each NVM module (e.g., NVM module 160-1, FIG. 1B) to store information about open erase blocks in that NVM module. For example, in these embodiments, an open block status table 254 is maintained for each NVM module 160 (FIG. 1B) of a storage device. Stated another way, in these embodiments, a plurality of status monitoring data structures 254 are maintained, and each status monitoring data structure 254 is used to status information about open erase blocks in a particular NVM module (e.g., with reference to FIG. 1B, a respective open block status table 254 maintains status information about open erase blocks in NVM-1 through NVM-n of NVM module 160-1 and a different open block status table 254 status information about open erase blocks in NVM 142-1 through 142-k within NVM module 160-m). In some embodiments, only information about open erase blocks in active portions of each NVM module (e.g., active superblocks in each NVM module) is stored in each open block status table.

In some embodiments, the data structures discussed above (e.g., open block status table 224 and open block status table 254) contain a record for all erase blocks (i.e., not just the open erase blocks) that are part of a particular storage medium in a storage device (e.g., storage medium 132, FIG. 1A or NVM devices 140, 142, FIG. 1B). In these embodiments, each record in the open block status table indicates whether an erase block is an open erase block by the value stored in the "Last Written Word Line ID" field (e.g., only the erase blocks associated with records that contain a non-null value for the last written word line are open erase blocks). Alternatively, in these embodiments, the open block status table contains an additional field, such as an "Open Block?" flag, which is used to indicate whether each record is associated with an erase block that is an open erase block (e.g., a "True" or "1" value indicates that the erase block is an open erase block and a "False" or "0" value indicates that the erase block is not an open erase block).

Figure 4:
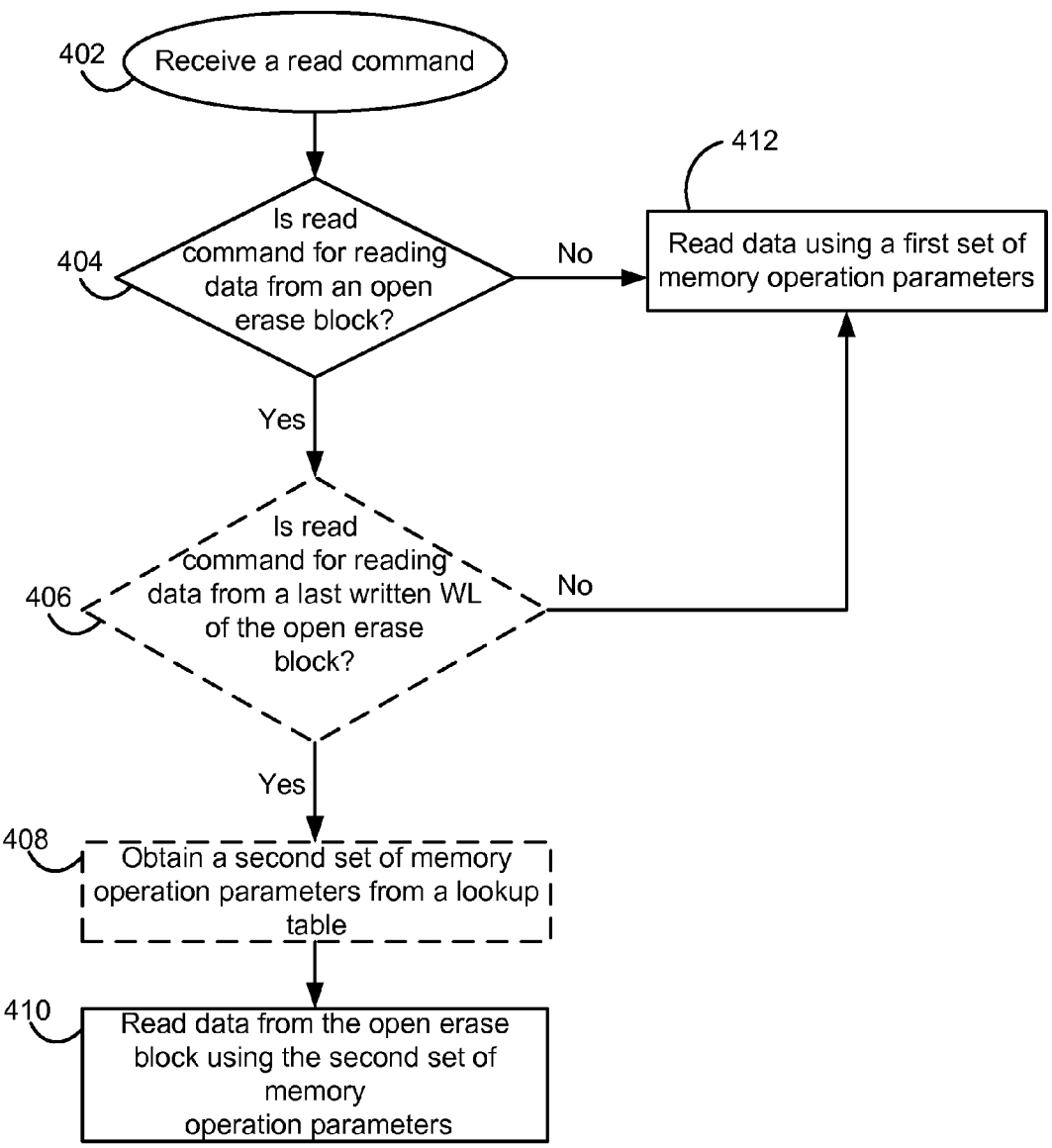
FIG. 4 illustrates a flowchart representation of a method of open erase block read automation in a storage device in accordance with some embodiments.

FIG. 4 illustrates a flowchart representation of a method of open erase block read automation within a storage system, in accordance with some embodiments. With reference to the data storage systems 100 pictured in FIGS. 1A and 1B, in some embodiments, open erase block read automation method 400 is performed by a storage device (e.g., storage device 120, FIG. 1A or 1B) or one or more components of the storage device (e.g., storage controller 124 and/or NVM controllers 130). In some embodiments, the storage device is operatively coupled with a host system (e.g., computer system 110). In some embodiments, open erase block read automation method 400 is governed by instructions that are stored in a non-transitory computer-readable storage medium and that are executed by one or more processors of a device, such as the one or more processing units (CPUs) 122-1 of management module 121-1 and/or the one or more processing units (CPUs) 242 (as shown in FIG. 2B) of management module 121-3.

In some embodiments, some of the operations of open erase block read automation method 400 are performed at a host (e.g., computer system 110) and other operations of method 400 are performed at a storage device (e.g., storage device 120). In some embodiments, open erase block read automation method 400 is governed, at least in part, by instructions that are stored in a non-transitory computer-readable storage medium and that are executed by one or more processors of a host (not shown in FIGS. 1A and 1B).

For ease of explanation, the following describes open erase block read automation method 400 as performed by a storage device (e.g., by storage controller 124 of storage device 120, FIGS. 1A and 1B, and/or by NVM controllers 130 of NVM modules 160, FIG. 1B). With reference to FIGS. 2A and 2B, in some embodiments, the operations of method 400 are performed, at least in part, by a data read module (e.g., data read module 214 and/or data read module 246), a status lookup module (e.g., status lookup module 222 and/or status lookup module 252), and a memory operation parameters module (e.g., memory operation parameters module 228 and/or memory operation parameters module 258) of management module 121-1 and/or management module 121-3. However, those skilled in the art will appreciate that in other embodiments, one or more of the operations described in open erase block read automation method 400 are performed by a host (e.g., computer system 110).

Open erase block read automation method 400 begins, in some embodiments, when the storage device receives (402) a read command (e.g., a command to read data from a non-volatile memory of the storage device). In some circumstances, the read command is received from a host (e.g., computer system 110) and requests a read operation at a particular logical address (e.g., a logical block address (LBA)) that corresponds to a predefined portion of an erase block (e.g., one or more pages on a word line in the erase block) of the non-volatile memory. For example, the storage device 120 receives a read command from computer system 110 requesting a read operation at LBA 12. In response to receiving the read command, the storage device performs a first determination (404) as to whether the read command is for reading data from an open erase block. In some embodiments, performing the first determination involves at least two operations: 1) performing a lookup in a mapping table to retrieve (or determine) a physical address corresponding to the received read command (e.g., a physical address of the predefined portion of the erase block of the non-volatile memory corresponding to LBA 12) and 2) performing a lookup in an open block status table (i.e., a data structure that is distinct from the mapping table) to determine whether the physical address corresponding to the received read command identifies an open erase block.

For example, as to the first operation of the first determination, the storage device (or a component thereof, such as mapping module 212, FIG. 2A) performs a lookup in the mapping table (e.g., a logical-to-physical address translation table) and determines a physical address corresponding to LBA 12. The physical address includes information sufficient to identify a block and a word line in the block, and in some embodiments predefined portions of the physical address include an identifier for a block and an identifier for a word line in (or other portion of) the block. As to the second operation of the first determination, the storage device (or a component thereof, such as a status lookup module (e.g., status lookup module 222 or status lookup module 252, FIGS. 2A and 2B)) performs a lookup in the open block status table to retrieve a record, if any, associated with the identifier for the erase block and to determine whether the retrieved record, if any, indicates that the erase block is an open erase block. In some embodiments, failure to locate in the open block status table a record corresponding to the physical address indicates that the block being accessed is not an open block.

In response to the first determination indicating that the received read command is not for reading data from an open erase block (404—No), the storage device reads (412) data from the non-volatile memory using a first set of memory operation parameters. In some embodiments, depending on the structure of the open block status table, the first determination indicates that the received read command is not for reading data from an open erase block in at least the following circumstances: 1) no record is contained in the open block status table for the identifier for the erase block (in other words, the erase block is not an open erase block because the erase block is fully written, fully erased, or unmapped, and in these embodiments, the open block status table only contains records for erase blocks that are open erase blocks) and 2) the retrieved record associated with the identifier for the erase block includes a null value (or a null pointer) in the "Last Written Word Line ID" field (in other words, in these alternative embodiments, the open block status table contains entries for at least some erase blocks that are not open erase block and indicates that an erase block is not open by storing a null value in the "Last Written Word Line ID" field).

In some embodiments, in response to the first determination instead indicating that the received read command is for reading data from an open erase block (404—Yes), the storage device proceeds to conduct a second determination as to whether the received read command is for reading data from a last written word line of the open erase block. In some embodiments, the first and second determination are part of a single determination (e.g., a single determination performed by data read module 214 and/or data read module 234 after receiving the read command at processing step 402) and, thus, processing step 406 is indicated with dashed lines to reflect the optional nature of processing step 406 (since processing step 406 is, in some embodiments, part or a portion of processing step 404 and is not an independent or standalone processing step).

In response to (or in accordance with) the second determination indicating that the read command is not for reading data from the last written word line of an open erase block (406—No), the storage device reads (412) data from the non-volatile memory using the first set of memory operation parameters. Therefore, in some embodiments, the first set of memory operation parameters are used to read data from the non-volatile memory when the read command is not for reading data from an open erase block and is also used to read data from the non-volatile memory when the read command is for reading data from a word line that is not the last written word line of an open erase block. As such, the first set of memory operation parameters is, in some embodiments, called a default set of memory operation parameters because the first/default set defines appropriate read thresholds for most read operations performed at the storage device.

In response to (or in accordance with) the second determination instead indicating that the read command is for reading data from a last written word line of the open erase block (406—Yes), the storage device optionally obtains (408) a second set of memory operation parameters from a lookup table (i.e., the second set of memory operation parameters is different from the first set of memory operation parameters). Alternatively, in some embodiments, the storage device obtains the second set of memory operation parameters by adjusting one or more of the first set of memory operation parameters, such as one or more read thresholds, by one or more offsets. In some embodiments, the storage device then reads data (410) from the non-volatile memory using the second set of memory operation parameters. For example, if the received read command was for reading data from the last written word line of the block identified by PA 3 (memory portion 320, FIG. 3D), then the storage device would read data from the non-volatile memory using the second set of memory operation parameters. Therefore, the second set of memory operation parameters is, in some embodiments, used only for reading from a last written word line of an open erase block, in order to minimize the potential for erroneous data readings caused by potential elevations in the bit error rate for the last written word line.

Additional details concerning each of the processing steps discussed above for open erase block read automation method 400, as well as details concerning additional processing steps for open erase block read automation (in particular, processing steps for read commands that are for reading data from an open erase block), are presented below with reference to FIGS. 5A-5C.

Figure 5A:
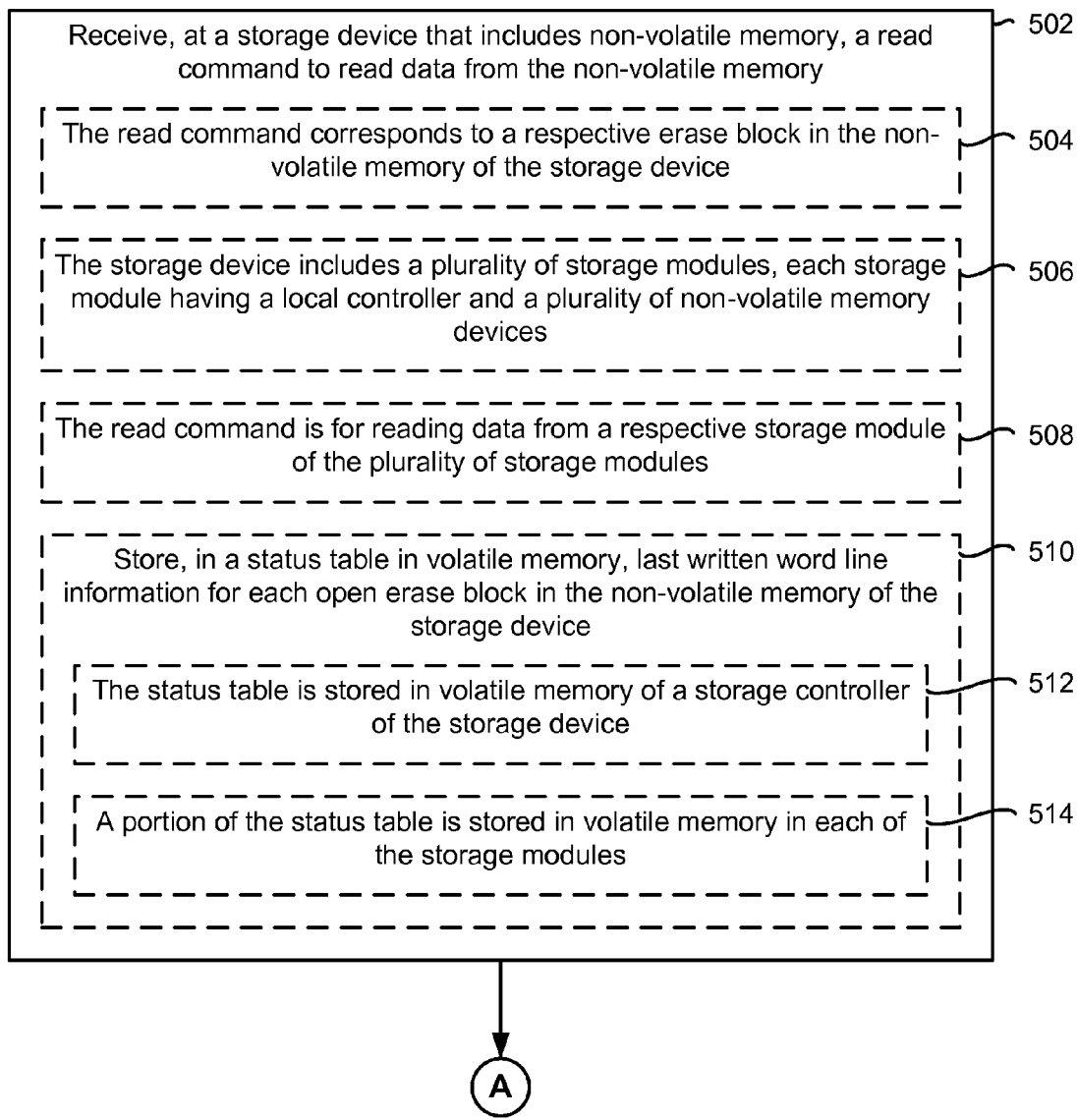
FIGS. 5A-5C illustrate flowchart representations of methods of open erase block read automation in a storage device, in accordance with some embodiments.
Figure 5B:
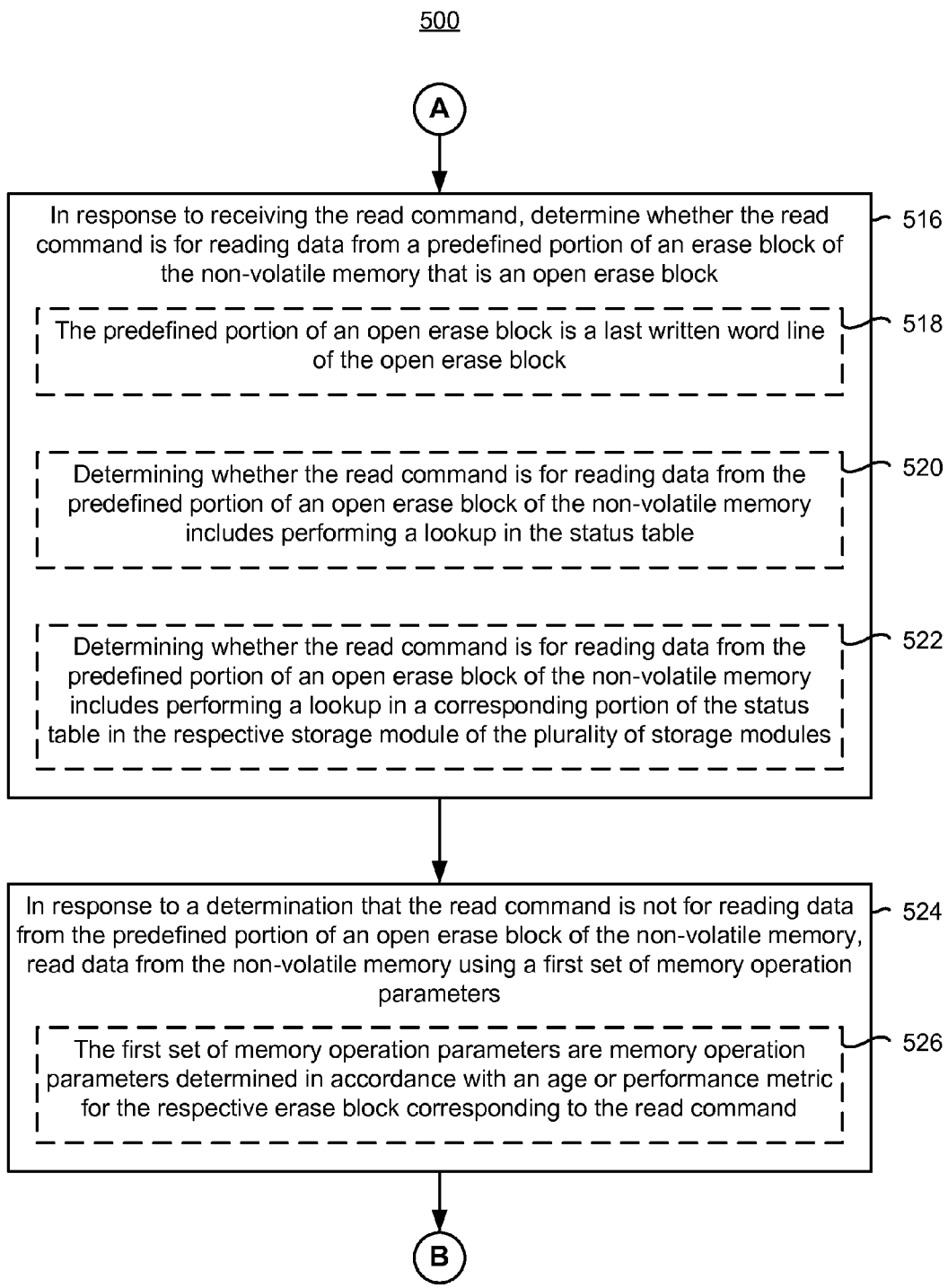
Figure 5C:
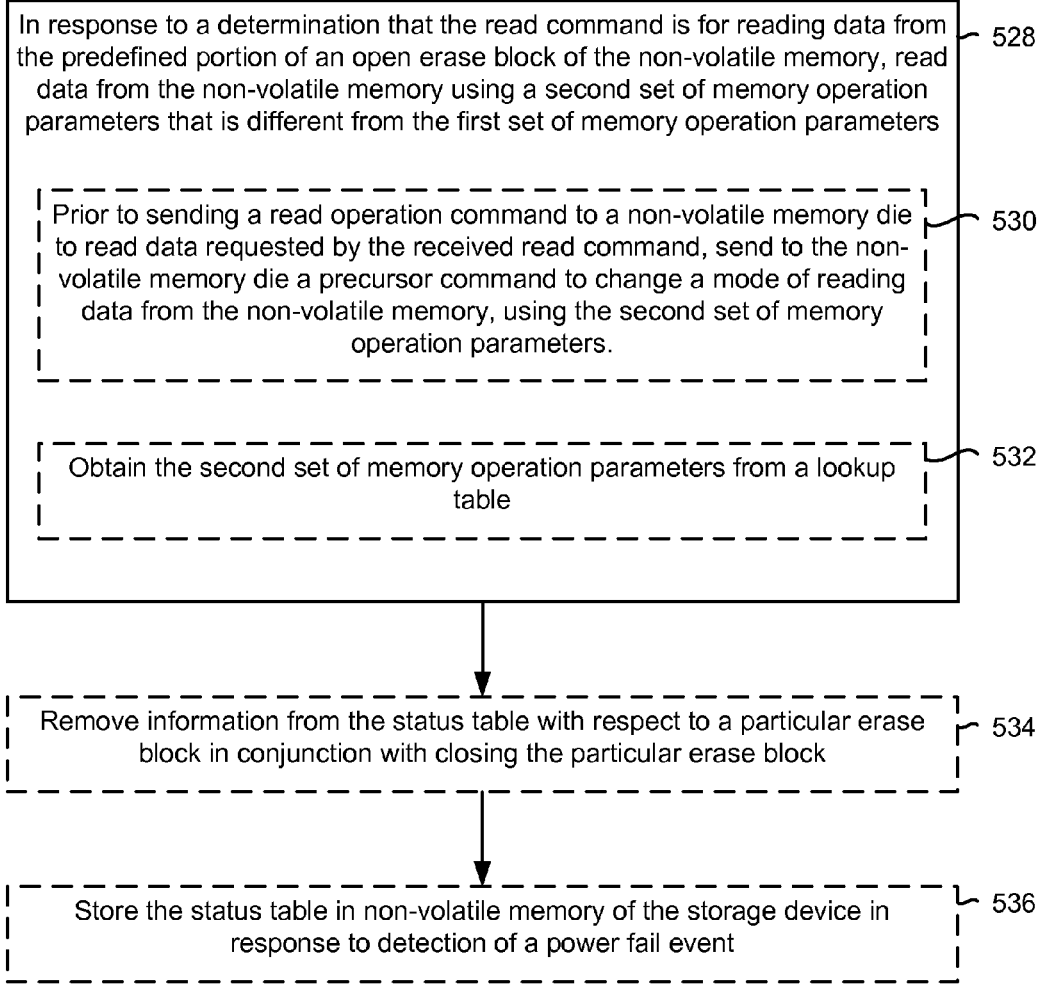

FIGS. 5A-5C illustrate flowchart representations of a method of open erase block read automation within a storage system, in accordance with some embodiments. With reference to the data storage systems 100 pictured in FIGS. 1A and 1B, in some embodiments, a method 500 is performed by a storage device (e.g., storage device 120) or one or more components of the storage device (e.g., storage controller 124 and/or NVM controllers 130). In some embodiments, the storage device is operatively coupled with a host system (e.g., computer system 110). In some embodiments, the method 500 is governed by instructions that are stored in a non-transitory computer-readable storage medium and that are executed by one or more processors of a device, such as the one or more processing units (CPUs) 122-1 of management module 121-1 and/or the one or more processing units (CPUs) 242 (as shown in FIG. 2B) of management module 121-3.

In some embodiments, some of the operations of method 500 are performed at a host (e.g., computer system 110) and other operations of method 500 are performed at a storage device (e.g., storage device 120). In some embodiments, method 500 is governed, at least in part, by instructions that are stored in a non-transitory computer-readable storage medium and that are executed by one or more processors of a host (not shown in FIGS. 1A and 1B).

For ease of explanation, the following describes open erase block read automation method 500 as performed by a storage device (e.g., by storage controller 124 of storage device 120, FIGS. 1A and 1B, and/or by NVM controllers 130 of NVM modules 160, FIG. 1B). With reference to FIGS. 2A and 2B, in some embodiments, the operations of method 500 are performed, at least in part, by a data read module (e.g., data read module 214 and/or data read module 246), a status lookup module (e.g., status lookup module 222 and/or status lookup module 252), and a memory operation parameters module (e.g., memory operation parameters module 228 and/or memory operation parameters module 258) of management module 121-1 and/or management module 121-3. However, those skilled in the art will appreciate that in other embodiments, one or more of the operations described in open erase block read automation method 500 are performed by a host (e.g., computer system 110).

With reference to FIG. 5A, a storage device (e.g., storage device 120, FIGS. 1A and 1B) receives (502) a read command to read data from non-volatile memory of the storage device, for example storage medium 132 of storage device 120, FIG. 1. In some circumstances, the read command corresponds to a respective erase block in the non-volatile memory of the storage device (504). In some embodiments or circumstances, the read command is received by a storage controller of the storage device (e.g., storage controller 124, FIGS. 1A and 1B). In some embodiments, the storage device includes (506) a plurality of storage modules (e.g., NVM modules 160, FIG. 1B), each storage module having a local controller distinct from the storage controller (e.g., NVM controllers 130, FIG. 1B) and a plurality of non-volatile memory devices (NVM devices 140 and 142, FIG. 1B). In some embodiments, the read command is for reading data from a respective storage module (508) of the plurality of storage modules (e.g., the respective erase block in the non-volatile memory, corresponding to the read command (504), is located at the respective storage module).

In some embodiments, the storage device stores (510), in a status table (e.g., an open block status table, such as open block status table 224 and/or open block status table 254) in volatile memory, last written word line information for each open erase block in the non-volatile memory of the storage device. In some embodiments, storing last written word line information for each open erase block includes storing such information for all erase blocks, while in other embodiments, storing last written word line information for each open erase block includes storing such information only for open erase blocks (i.e., not for fully written or erased erase blocks). In yet other embodiments, the information stored in the status table also depends on whether the word line is a final word line (i.e., the final word line is the word line occupying the last section of physical space within the erase block or, stated another way, the final word line is the word line that borders the next erase block) in the erase block and, in these yet other embodiments, the status table does not store information for an erase block if the last written word line is also the final word line in the erase block. In some embodiments, the status table is stored in volatile memory of a storage controller (512) of the storage device. In some embodiments, a portion of the status table is stored in volatile memory in each of the storage modules (514).

With reference to FIG. 5B, in response to receiving the read command, the storage device determines (516) whether the read command is for reading data from a predefined portion of an erase block of the non-volatile memory that is an open erase block. In some embodiments, the storage device determines whether the read command is for reading data from a predefined portion of any open erase block of the non-volatile memory. In some embodiments, the predefined portion of an open erase block is a last written word line of the open erase block (518). In some embodiments, determining whether the read command is for reading data from the predefined portion of an open erase block of the non-volatile memory includes performing (520) a lookup in the status table (e.g., one or more of the open block status tables discussed above).

In some embodiments, determining whether the read command is for reading data from the predefined portion of an erase block of the non-volatile memory includes performing a lookup in a corresponding portion of the status table in the respective storage module of the plurality of storage modules (522). In some embodiments, determining whether the read command is for reading data for a predefined portion of an (or any) open erase block includes querying the status table (e.g., open block status table 224 and/or open block status table 254, FIG. 3C). For example, a status lookup module (e.g., status lookup module 222 and/or status lookup module 252, FIGS. 2A and 2B) retrieves a record, if any, associated with the erase block corresponding to the read command and determines whether the record, if any, indicates that the erase block is an open erase block and whether the read command is for reading data from the last written word line of the open erase block (discussed in more detail above in reference to FIGS. 3C-3D and 4). As explained above, if the status lookup module determines that the status table does not contain any record for the erase block corresponding to the read command, that indicates that the read command is not for reading data from an open erase block.

In response to a determination that the read command is not for reading data from the predefined portion of an open erase block of the non-volatile memory, the storage device reads data (524) from the non-volatile memory using a first set of memory operation parameters. In some embodiments, each set of memory operation parameters (including the first set) includes a set of read thresholds and, optionally, includes a read mode (e.g., designating whether the next read operation is a normal read operation or a "slow read" operation). In some embodiments, a "slow read" operation is a read operation that is performed in order to minimize the potential for data read errors (e.g., a read operation performed at a last written word line of an open erase block in order to minimize potential data read errors due to an elevated bit error rate at the last written word line). In some embodiments, the first set of memory operation parameters is a default set of memory operation parameters (as discussed above in reference to processing step 412, FIG. 4). In some embodiments or circumstances, the first set of memory operation parameters are memory operation parameters determined in accordance with an age metric or performance metric (e.g., these metrics are maintained by a parameter adjusting module 230 and/or a parameter adjusting module 260) for the respective erase block corresponding to the read command (526).

With reference to FIG. 5C, in some embodiments, in response to a determination that the read command is for reading data from the predefined portion of an open erase block of the non-volatile memory, the storage device reads data (528) from the non-volatile memory using a second set of memory operation parameters that is different from the first set of memory operation parameters. In some embodiments, the storage device obtains the second set of memory operation parameters (e.g., using a memory operation parameters module 228 and/or a memory operations parameters module 258) by adjusting one or more of the first set of memory operation parameters, such as one or more read thresholds, by one or more offsets. In some embodiments, the one or more offsets are retrieved, or determined on an ad-hoc basis by the parameter adjusting module 230 and/or the parameter adjusting module 260, based on a metric for the erase block, such as an bit error rate associated with the last written word line.

In some embodiments, reading data from the non-volatile memory includes sending (or issuing) a read operation command to a non-volatile memory die (e.g., a portion of the non-volatile memory, such as a single non-volatile memory die of NVM device 140-1, FIG. 1B). In some embodiments, prior to sending a read operation command to a non-volatile memory die to read data requested by the received read command, the storage device sends (530) to the non-volatile memory die a precursor command to change a mode of reading data from the non-volatile memory, using the second set of memory operation parameters. In some embodiments or circumstances, the precursor command includes test mode commands (e.g., commands to adjust the trim register of the storage device). In some embodiments, the storage device obtains (532) the second set of memory operation parameters from a lookup table. Furthermore, in some embodiments, the lookup table is distinct from both the logical-to-physical mapping and the status tables discuss above. For example, in some embodiments, the lookup table is a data structure that stores command recipes (i.e., sets of read thresholds). In some embodiments, the data structure that stores command recipes is indexed so that lookups can be performed in the data structure using a metric for the non-volatile memory die or for the open erase block, such as a program/erase (P/E) count for the open erase block or the bit error rate corresponding to the predefined portion of the open erase block (e.g., the last written word line).

In some embodiments, the storage device removes (534) information from the status table with respect to a particular erase block in conjunction with closing the particular erase block. Alternatively, or in addition, the storage device clears information from the status table with respect to the particular erase block in conjunction with erasing the particular erase block. For example, if the storage device processes a write operation at PA 3 of memory portion 320 (FIG. 3D) that results in fully writing to all available storage at PA 3 (i.e., all pages of all word lines are written, such that no word lines are empty), then the storage device (or a component thereof, such as status updating module 226 and/or status updating module 256) also updates open block status table 224 and/or open block status table 254 to indicate that PA 3 is no longer an open erase block. In some embodiments, the storage device removes record 316-1 from the open block status table. In other embodiments, the storage device updates record 316-1 to contain a null value (or a null pointer) in the "Last Written Word Line ID" field. To achieve faster command execution times for write and erase operations at open erase blocks, the storage device does not update the open block status table until after the operation (e.g., a write or erase operation) has finished.

In some embodiments, in order to preserve information about open erase blocks, the storage device stores (536) the status table (e.g., open block status table 224 and/or open block status table 254) in non-volatile memory of the storage device in response to detection of a power fail event. In some embodiments, the storage device stores the status table in non-volatile memory of the storage device after receiving an indication (or in response to the indication) that the storage device is entering a scheduled power cycle or reboot. Thus, the storage device copies (or transfers) the status table from volatile memory to non-volatile memory in order to ensure that information about the open erase blocks is not lost during a power failure (or a scheduled power cycle or reboot) that affects the storage device.

It will be understood that, although the terms "first," "second," etc. may be used herein to describe various elements, these elements should not be limited by these terms. These terms are only used to distinguish one element from another. For example, a first transistor could be termed a second transistor, and, similarly, a second transistor could be termed a first transistor, without changing the meaning of the description, so long as all occurrences of the "first transistor" are renamed consistently and all occurrences of the "second transistor" are renamed consistently. The first transistor and the second transistor are both transistors, but they are not the same transistor.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of managing a storage device that includes non-volatile memory, the method comprising:
   receiving, at the storage device, a read command to read data from the non-volatile memory of the storage device; and
   in response to receiving the read command,
      determining whether the read command is for reading data from a predefined portion of an erase block of the non-volatile memory that is an open erase block;
      in response to a determination that the read command is not for reading data from the predefined portion of an open erase block of the non-volatile memory, reading data from the non-volatile memory using a first set of memory operation parameters; and
      in response to a determination that the read command is for reading data from the predefined portion of an open erase block of the non-volatile memory, reading data from the non-volatile memory using a second set of memory operation parameters that is different from the first set of memory operation parameters.

2. The method of claim 1, wherein the predefined portion of any open erase block of the non-volatile memory is a last written word line of the open erase block.

3. The method of claim 1, wherein:
   the read command corresponds to a respective erase block in the non-volatile memory; and
   the first set of memory operation parameters are memory operation parameters determined in accordance with an age metric or performance metric for the respective erase block corresponding to the read command.

4. The method of claim 1, further comprising obtaining the second set of memory operation parameters from a lookup table.

5. The method of claim 1, further comprising, prior to sending a read operation command to a non-volatile memory die to read data requested by the received read command, sending to the non-volatile memory die a precursor command to change a mode of reading data from the non-volatile memory, using the second set of memory operation parameters.

6. The method of claim 1, further comprising storing, in a status table in volatile memory, last written word line information for each open erase block in the non-volatile memory.

7. The method of claim 6, wherein determining whether the read command is for reading data from the predefined portion of an open erase block of the non-volatile memory comprises performing a lookup in the status table.

8. The method of claim 6, further comprising removing information from the status table with respect to a particular erase block in conjunction with closing the particular erase block.

9. The method of claim 6, wherein the status table is stored in volatile memory of a storage controller of the storage device.

10. The method of claim 6, wherein:
    the storage device includes a plurality of storage modules; and
    each storage module has a local controller, a plurality of non-volatile memory devices; and volatile memory in which a portion of the status table is stored.

11. The method of claim 10, wherein:
    the read command is for reading data from a respective storage module of the plurality of storage modules; and
    determining whether the read command is for reading data from the predefined portion of an open erase block of the non-volatile memory comprises performing a lookup in a corresponding portion of the status table in the respective storage module of the plurality of storage modules.

12. The method of claim 6, further comprising storing the status table in the non-volatile memory in response to detection of a power fail event.

13. A storage device, comprising:
    non-volatile memory;
    one or more processors; and
    one or more controller modules configured to:
       receive a read command to read data from the non-volatile memory;
       determine, in response to receiving the read command, whether the read command is for reading data from a predefined portion of an erase block of the non-volatile memory that is an open erase block;
       read data from the non-volatile memory using a first set of memory operation parameters in response to a determination that the read command is not for reading data from the predefined portion of an open erase block of the non-volatile memory; and
       read data from the non-volatile memory using a second set of memory operation parameters that is different from the first set of memory operation parameters in response to a determination that the read command is for reading data from the predefined portion of an open erase block of the non-volatile memory.

14. The storage device of claim 13, wherein the one or more controller modules include:
    a command module to receive the read command to read data from the non-volatile memory;
    a status lookup module to determine, in response to the command module receiving the read command, whether the read command is for reading data from the predefined portion of any open erase block of the non-volatile memory; and
    a data read module to:
       read data from the non-volatile memory using the first set of memory operation parameters in response to a determination that the read command is not for reading data from the predefined portion of an open erase block of the non-volatile memory; and
       read data from the non-volatile memory using a second set of memory operation parameters that is different from the first set of memory operation parameters in response to a determination that the read command is for reading data from the predefined portion of an open erase block of the non-volatile memory.

15. The storage device of claim 13, further comprising:
a status table that stores last written word line information for each open erase block in the non-volatile memory; and
a plurality of storage modules, each storage module having a local controller and a plurality of non-volatile memory devices, wherein a portion of the status table is stored in each of the storage modules.

16. The storage device of claim 14, further comprising:
a status table that stores last written word line information for each open erase block in the non-volatile memory; and
a plurality of storage modules, each storage module comprising:
  a local controller including an instance of the status lookup module and an instance of the data read module; and
  a plurality of non-volatile memory devices, wherein a portion of the status table is stored in each of the storage modules;
wherein:
  the read command is for reading data from a respective storage module of the plurality of storage modules; and
  determining whether the read command is for reading data from the predefined portion of an open erase block of the non-volatile memory comprises performing a lookup in a corresponding portion of the status table in the respective storage module of the plurality of storage modules.

17. The storage device of claim 13, wherein the predefined portion of any open erase block of the non-volatile memory is a last written word line of the open erase block.

18. The storage device of claim 13, wherein:
the read command corresponds to a respective erase block in the non-volatile memory of the storage device; and
the first set of memory operation parameters are memory operation parameters determined in accordance with an age metric or performance metric for the respective erase block corresponding to the read command.

19. A non-transitory computer-readable storage medium, storing one or more programs configured for execution by one or more processors of a storage device, the one or more programs including instructions that, when executed by the one or more processors, cause the storage device to:
  receive a read command to read data from the non-volatile memory;
  determine, in response to receiving the read command, whether the read command is for reading data from a predefined portion of an erase block of the non-volatile memory that is an open erase block;
  read data from the non-volatile memory using a first set of memory operation parameters in response to a determination that the read command is not for reading data from the predefined portion of an open erase block of the non-volatile memory; and
  read data from the non-volatile memory using a second set of memory operation parameters that is different from the first set of memory operation parameters in response to a determination that the read command is for reading data from the predefined portion of an open erase block of the non-volatile memory.

20. The non-transitory computer-readable storage medium of claim 19, wherein:
  the storage device includes a storage controller that includes the one or more processors;
  the one or more programs include one or more controller modules configured for execution by the one or more processors of the storage controller; and
  the one or more controller modules include:
  a command module to receive the read command to read data from the non-volatile memory;
  a status lookup module to determine, in response to the command module receiving the read command, whether the read command is for reading data from the predefined portion of an open erase block of the non-volatile memory; and
  a data read module to:
    read data from the non-volatile memory using the first set of memory operation parameters in response to a determination that the read command is not for reading data from the predefined portion of an open erase block of the non-volatile memory; and
    read data from the non-volatile memory using a second set of memory operation parameters that is different from the first set of memory operation parameters in response to a determination that the read command is for reading data from the predefined portion of an open erase block of the non-volatile memory.

* * * * *